US007298106B2

(12) United States Patent
Yamamoto et al.

(10) Patent No.: US 7,298,106 B2
(45) Date of Patent: Nov. 20, 2007

(54) MOTOR DRIVING DEVICE AND MOTOR DRIVING METHOD

(75) Inventors: Yasunori Yamamoto, Osaka (JP); Hideaki Mori, Hyogo (JP); Shinichi Kuroshima, Osaka (JP); Yoshiaki Igarashi, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/490,985

(22) Filed: Jul. 21, 2006

(65) Prior Publication Data
US 2007/0018599 A1    Jan. 25, 2007

(30) Foreign Application Priority Data
Jul. 21, 2005    (JP)    ............... 2005-211290

(51) Int. Cl.
*H02P 25/12* (2006.01)
(52) U.S. Cl. .............. 318/439; 318/254; 318/560; 702/151
(58) Field of Classification Search ........... 318/139, 318/245, 254, 439, 560, 700; 702/151
See application file for complete search history.

(56) References Cited

U.S. PATENT DOCUMENTS

| | | | |
|---|---|---|---|
| 4,876,491 A | | 10/1989 | Squires et al. |
| 4,958,948 A | * | 9/1990 | Seima et al. ............... 388/812 |
| 4,992,710 A | | 2/1991 | Cassat |
| 5,001,405 A | | 3/1991 | Cassat |
| 5,172,036 A | * | 12/1992 | Cameron .................... 318/138 |
| 5,198,733 A | * | 3/1993 | Wright ...................... 318/254 |
| 5,221,881 A | * | 6/1993 | Cameron .................... 318/254 |
| 5,294,877 A | * | 3/1994 | Cameron .................... 318/809 |
| 5,306,988 A | * | 4/1994 | Carobolante et al. ....... 318/254 |
| 5,517,095 A | * | 5/1996 | Carobolante et al. ....... 318/254 |
| 5,616,996 A | * | 4/1997 | Tang et al. .................. 318/439 |
| 6,456,030 B1 | * | 9/2002 | Masaki et al. .............. 318/700 |
| 6,483,270 B1 | * | 11/2002 | Miyazaki et al. ........... 318/700 |
| 6,586,902 B2 | * | 7/2003 | Gotou et al. ................ 318/560 |
| 6,680,593 B2 | * | 1/2004 | Gotou ........................ 318/254 |
| 7,095,195 B2 | * | 8/2006 | Tagome et al. ............. 318/268 |
| 7,246,029 B2 | * | 7/2007 | Chen et al. ................. 702/151 |
| 2002/0017887 A1 | * | 2/2002 | Gotou et al. ................ 318/560 |
| 2002/0043953 A1 | * | 4/2002 | Masaki et al. .............. 318/700 |
| 2002/0121871 A1 | * | 9/2002 | Gotou ........................ 318/254 |
| 2003/0102832 A1 | | 6/2003 | Iwanaga et al. |
| 2004/0222758 A1 | * | 11/2004 | Tagome et al. ............. 318/268 |
| 2006/0052976 A1 | * | 3/2006 | Chen et al. ................. 702/151 |

FOREIGN PATENT DOCUMENTS

| | | |
|---|---|---|
| JP | 63-069489 | 3/1988 |
| JP | 03-207250 | 9/1991 |
| JP | 08-013196 | 2/1996 |
| JP | 25-047778 | 8/1996 |
| JP | 2003-174789 | 6/2003 |

* cited by examiner

*Primary Examiner*—Paul Ip
(74) *Attorney, Agent, or Firm*—RatnerPrestia

(57) ABSTRACT

A rotor position sensorless multiphase motor driving device includes a rotor; a plurality of phase windings; a common terminal to which one terminal of terminals at both ends of each winding is star connected; an upper-side drive transistor and a lower-side drive transistor connected to the other terminal of the winding; a commutation control unit operable to select two terminals other than the common terminal of the windings, and to turn on the corresponding pair of upper-side drive transistor and the lower-side drive transistor; a rotor position search pulse applying unit operable to apply a search pulse to the selected two terminals; and a comparing unit operable to detect a rotor position based on a response signal generated between the terminal which was unselected and the common terminal according to the search pulse application.

53 Claims, 18 Drawing Sheets

ELECTRICAL ANGLE (°)

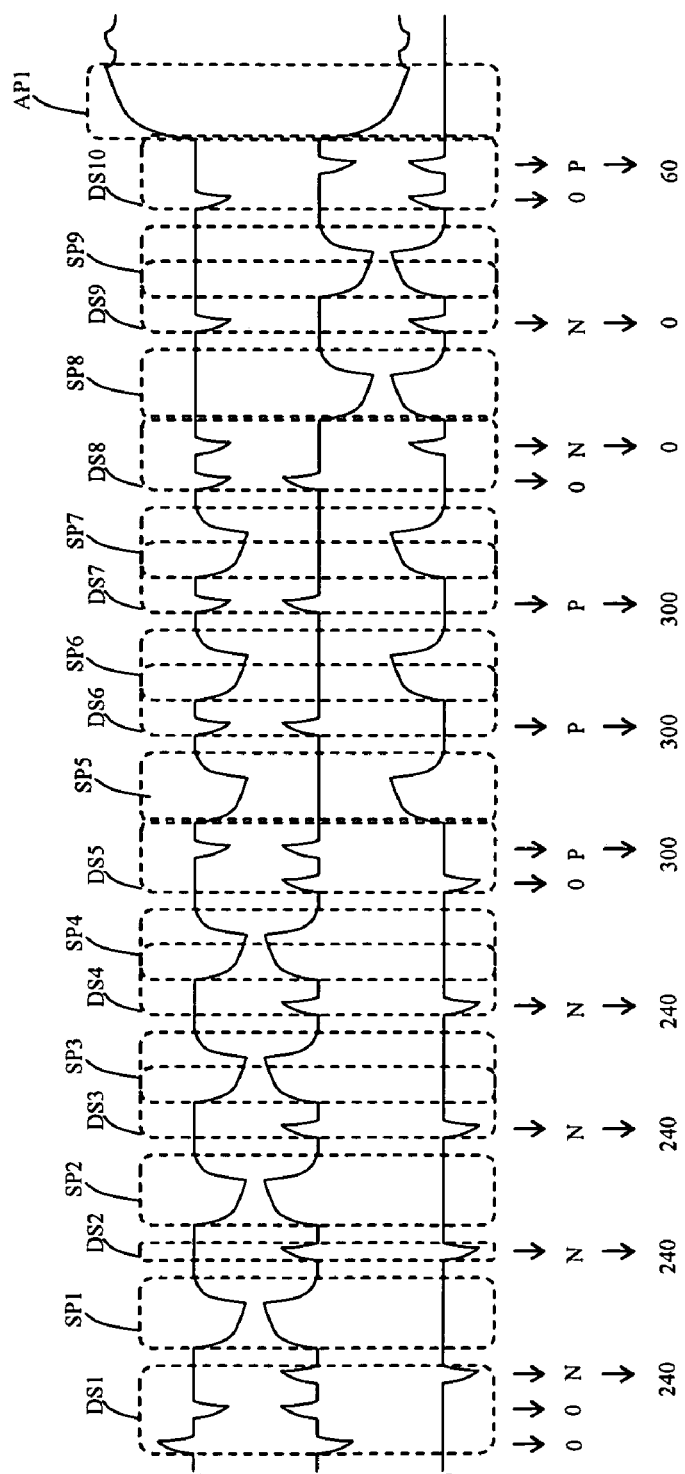

ELECTRICAL ANGLE (°)

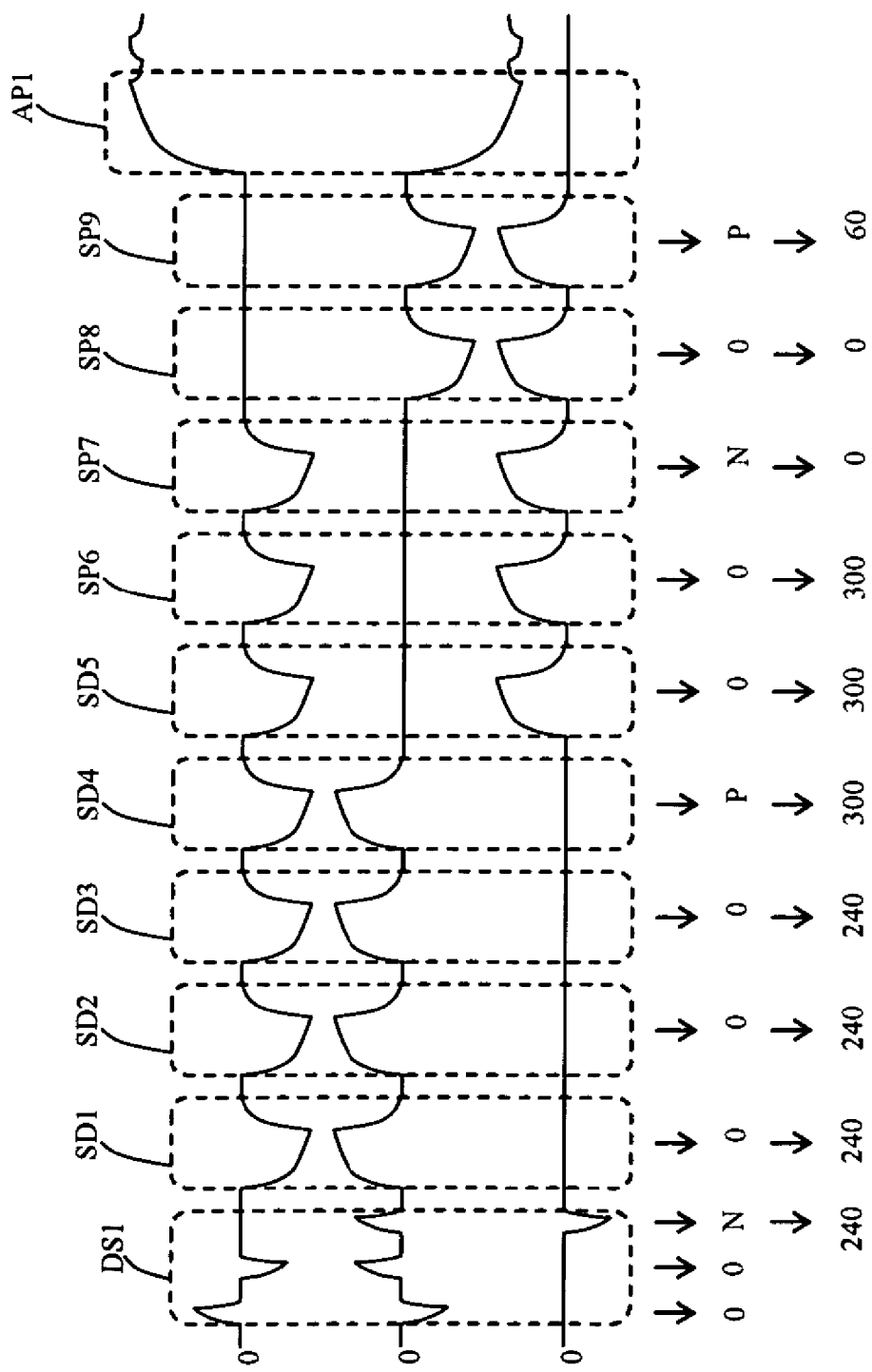

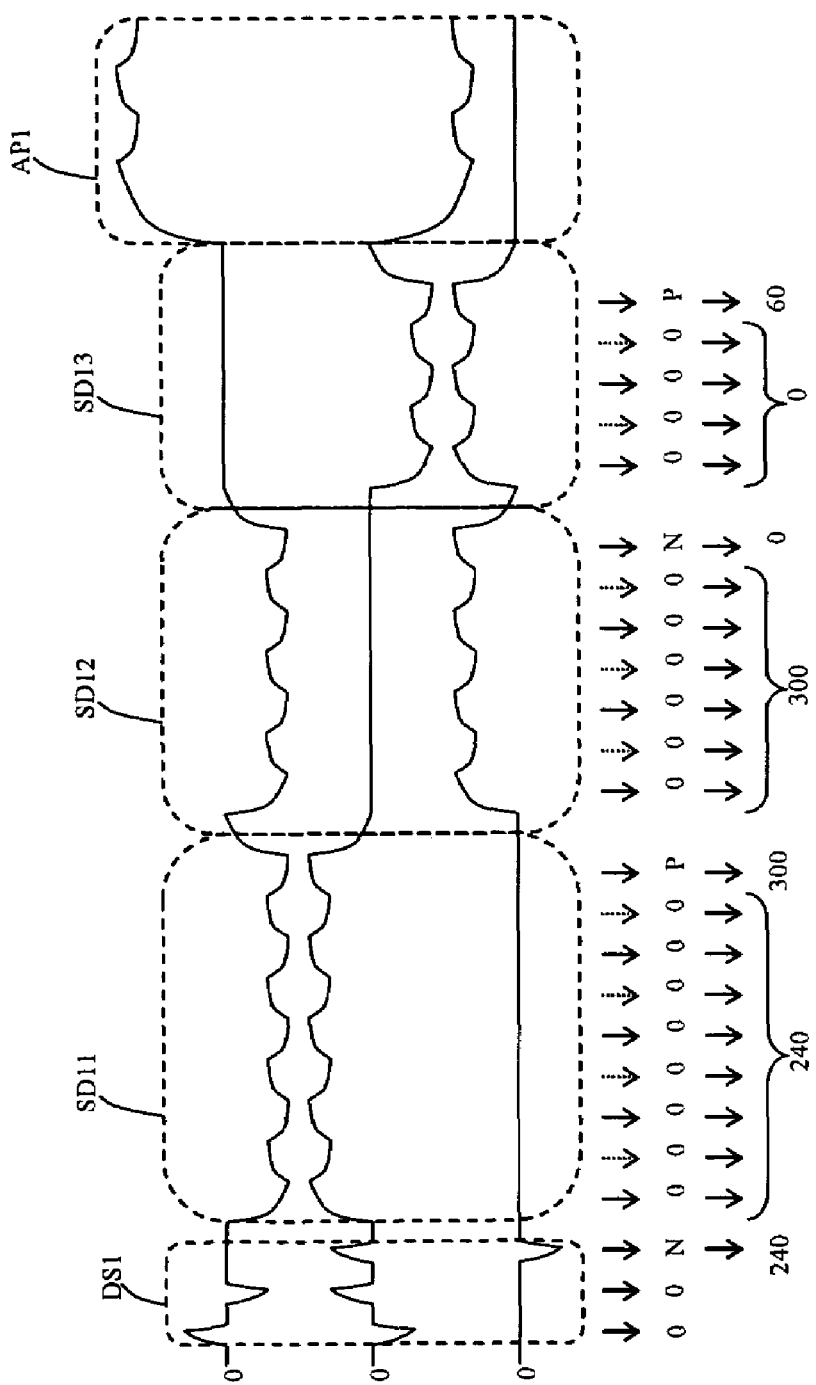

ELECTRICAL ANGLE (°)

MOTOR DRIVING DEVICE AND MOTOR DRIVING METHOD

This application is based on Japanese Patent Application No. 2005-211290 filed in Japan on Jul. 21, 2005, the contents of which are hereby incorporated by reference.

BACKGROUND OF THE INVENTION

1. Field of the Invention

The present invention relates to a three-phase brushless motor driving device which can immediately and stably start without a rotor position sensor and a motor driving method at the time of start.

2. Description of the Related Art

According to a brushless motor, in order to apply a stable torque to a rotor by selecting an appropriate winding of a stator to apply a current thereto, information of a relative position of electrical angle of the rotor with respect to the stator is needed. Various kinds of rotor position sensors to find the relative position of the electrical angle of the rotor with respect to the stator are used. Meanwhile, a sensorless driving technique which does not need the rotor position sensor has been developed in view of reliability or costs or environment resistance. According to such sensorless driving technique, it is well known that the rotor position is detected by reading a counter electromotive voltage generated in a stator phase winding while the rotor is rotated.

However, since the counter electromotive voltage is not generated when the rotor is stopped, the rotor position cannot be detected by the above method when the rotor is stopped. Thus, various kinds of methods of detecting the rotor position when the rotor is stopped have been proposed. For example, there is disclosed a method of detecting a rotor position from a stator phase which is sequentially selected and generates the highest amplitude of a current which flows when a rotor position search pulse is applied, as shown in Japanese Patent Publication No. 2547778. Furthermore, there is disclosed a method of finding a rotor position based on a result in which a polarity of a difference in response signal is sequentially detected by selecting a stator phase and applying a rotor position search pulse thereto in forward and backward directions as shown in Japanese Patent Publication No. 8-13196.

However, according to the method in the Japanese Patent Publication No. 2547778, there is a problem in accuracy in finding the peak value of the pulse current which flow when the rotor position search pulse is applied. Furthermore, as shown in FIG. 9, since a difference in pulse current peak value depending on the rotor position is small in the phase, it is necessary that variation in electric and magnetic characteristics that the stator and the rotor originally contain has to be small in the phase as a precondition. Therefore, the method is not suitable for an inexpensive motor in which characteristics with respect to each phase are not managed well. In addition, in case of a motor in which an inductance of a winding is low to attain high-speed characteristics, a pulse current is increased by itself, a current value to obtain the difference in pulse current peak value becomes high by itself. In addition, according to the method in the Japanese Patent Publication No. 8-13196, it is necessary to find the difference in response signal between positive and negative polarities of the rotor position search pulse signal, so that a table is needed to refer to a polarity combination of the response signal difference every phase. Thus, in order to implement the above method, an arithmetic processing ability is needed, which is not suitable for a case where controllability by a motor only is required or a case of an inexpensive motor driving system.

SUMMARY OF THE INVENTION

It is an object of the present invention to provide a motor driving device and a motor driving method in which a start period until a drive is switched from a start mode to a counter electromotive voltage feedback mode is shortened at low costs to improve a start speed.

In accordance with one aspect of the present invention, there is a rotor position sensorless multiphase motor driving device. The rotor position sensorless multiphase motor driving device includes:

a rotor;

a plurality of phase windings;

a common terminal to which one terminal of terminals at both ends of each winding is star connected;

an upper-side drive transistor and a lower-side drive transistor connected to the other terminal of the winding;

a commutation control unit operable to select two terminals other than the common terminal of the windings, and to turn on the corresponding pair of upper-side drive transistor and the lower-side drive transistor;

a rotor position search pulse applying unit operable to apply a search pulse to the selected two terminals; and a comparing unit operable to detect a rotor position based on a response signal generated between the terminal which was unselected and the common terminal according to the search pulse application.

The comparing unit can compare the response signal with a predetermined threshold value to detect the rotor position.

In addition, it may further include a setting unit operable to set at least one of a positive threshold value and a negative threshold value as the threshold value, and it may further include a varying unit operable to vary the threshold value.

Furthermore, it may further include a terminals line selecting unit operable to switch the input terminals of the comparing unit to the terminals of each winding.

Still furthermore, it may include a controlling unit operable to control a peak value of a start rotation pulse current in a start mode in which a rotation speed is very low at the time of start, and may include a controlling unit operable to control a peak value of a rotor position search pulse current in the start mode in which a rotation speed is very low at the time of start.

Still furthermore, it may further includes:

a current commanding unit operable to find that the rotor position search pulse current reaches a predetermined value in the start mode; and a transmitting unit operable to transmit an output of a commutation control comparator to a commutation control block at a timing when the pulse current value exceeds the current command value.

The comparing unit may include:

a first comparing unit operable to compare the response signal with a positive threshold value; and a second comparing unit operable to compare the response signal with a negative threshold value.

Also, the comparing unit may be used in the start mode and in a counter electromotive voltage feedback mode in which a counter electromotive voltage generated by rotation of the rotor is detected and commutation can be controlled.

In addition, the rotor position search pulse applying unit may apply a first search pulse to a selected first couple of terminals in a first polarity, in a case where the rotor position is not detected by the response signal in response to the first search pulse, it may apply a second search pulse to a selected second couple of terminals in the first polarity, in a case where the rotor position is not detected by the response signal in response to the second search pulse, it may apply a third search pulse to the first couple of terminals in a second polarity which is opposite to the first polarity, and in a case where the rotor position is not detected by the response signal in response to the third search pulse, it may apply a fourth search pulse to the second couple of terminals in the second polarity which is opposite to the first polarity.

In addition, instead of the above, in a case where the rotor position is not detected by the response signal in response to the second search pulse, it may apply a third search pulse to the second couple of terminals in a second polarity which is opposite to the first polarity, and in a case where the rotor position is not detected by the response signal in response to the third search pulse, it may apply a fourth search pulse to the first couple of terminals in the second polarity which is opposite to the first polarity.

Furthermore, regarding a phase which is common among a first couple of phases selected when the rotor position search pulse applying unit applies the first rotor position search pulse and a second couple of phases selected when it applies the second rotor position search pulse, in a case where the terminal of the phase is a current source when the first rotor position search pulse is applied, the terminal of the phase may be a current sink when the second rotor position search pulse is applied, and in a case where the terminal of the phase is the current sink when the first rotor position search pulse is applied, the terminal of the phase may be the current source when the second rotor position search pulse is applied.

Still furthermore, the rotor position search pulse applying unit may select a combination of predetermined phases as two terminals of one phase, among the first couple of terminals and the second couple of terminals.

A disk driving system according to the present invention may include:

the above motor driving device and a motor controlled by the motor driving device to drive a disk.

A motor driving method of a rotor position sensorless multiphase motor driving device including: a rotor; a plurality of phase windings; a common terminal to which one terminal of terminals at both ends of each winding is star connected; a plurality of a set of an upper-side drive transistor and a lower-side drive transistor connected to the other terminal of the winding; and a commutation control unit for turning on the pair of upper-side drive transistor or the lower-side drive transistor. The method includes:

selecting two terminals from the terminals other than the common terminal of the windings when the rotor is started and applying a search pulse between the selected two terminals to search a rotor position;

detecting the rotor position based on a response signal generated between the terminal which was not selected and the common terminal at the search pulse applying step; and applying a start rotation pulse based on the detected rotor position.

In addition, in a case where the rotor position is not detected in the rotor position detecting step, at least the search pulse applying step may be repeated.

Furthermore, in a case where the rotor position is not detected by the first search pulse at the rotor position detecting step, a second search pulse may be applied between the two terminals selected at the time of the first search pulse application, in a polarity opposite to that of the first search pulse application at the search pulse applying step.

Still furthermore, in a case where the rotor position is not detected by the second search pulse at the rotor position detecting step, a couple of terminals which is different from those at the time of the first and second search pulse application may be selected and a third search pulse may be applied between the selected terminals at the search pulse applying step.

Still furthermore, in a case where the rotor position is not detected by the third search pulse at the rotor position detecting step, a fourth search pulse may be applied between the two terminals selected at the time of the third search pulse application in a polarity opposite to that of the third search pulse application at the search pulse applying step.

Still furthermore, in a case where the rotor position is not detected by the fourth search pulse at the rotor position detecting step, a couple of terminals which is different from those at the time of the first to the fourth search pulse application may be selected and a fifth search pulse may be applied between the selected terminals at the search pulse applying step.

In addition, in a case where the rotor position is not detected by the fifth search pulse at the rotor position detecting step, a sixth search pulse may be applied between the two terminals selected at the time of the fifth search pulse application in a polarity opposite to that of the fifth search pulse application at the search pulse applying step.

Furthermore, in a case where the rotor position is detected at the rotor position detecting step, the start rotation pulse applying step may be performed and the first round may be completed, and then, the second round including the search pulse applying step, the rotor position detecting step and the start rotation pulse applying step to be performed.

Furthermore, at the search pulse applying step in the Nth round (N is an integer of 2 or more), the same search pulse as the previous search pulse by which the rotor position was detected in the (N−1)th round may be applied as the first search pulse to the two terminals selected when the previous search pulse by which the rotor position was detected was applied in the N−1)th round.

Furthermore, in a case where the first search pulse is applied at the search pulse applying step in the second round and the rotor position is not detected at the rotor position detecting step, a search pulse which can detect a position to which the rotor is rotated from a position which was detected at the rotor position detecting step in the first round by 60 electrical degrees may be applied as the second search pulse at the search pulse applying step.

Furthermore, in a case where a predetermined condition to switch a mode from the start mode to the counter electromotive voltage feedback mode is not satisfied, when a rotation speed, which is estimated from an interval of the rotor generated in the start mode, exceeds a predetermined value, while all phases are turned off for a predetermined time, a torque command profile estimated from an interval between counter electromotive voltage zero crosses of at least one phase and a counter electromotive voltage detecting period may be provided to switch the mode to the counter electromotive voltage feedback mode.

In a case where a predetermined condition to switch a mode from the start mode to the counter electromotive voltage feedback mode is not satisfied, a current peak level of the search pulse may be reduced.

In a case where a predetermined condition to switch a mode from the start mode to the counter electromotive voltage feedback mode is not satisfied, either one of a search pulse applying period or a search pulse PWM applying period may be reduced.

Furthermore, the rotor position may be determined by comparing the response signal in response to the search pulse with a predetermined threshold value at the rotor position detecting step. The threshold value may be set at the rotor position detecting step.

In a case where the rotor position is not detected at the rotor position detecting step, the threshold value may be changed and steps of the rotor position search pulse applying step may be repeated. In addition, the changed threshold value may be stored.

Furthermore, the driving method may further include a kick pulse applying step of applying, when it is determined that the rotor position is positioned at a dead point in a case where the rotor position is not detected at the rotor position detecting step, a predetermined number of kick pulses to shift the rotor position from the dead point, in which the steps of the rotor position search pulse applying step may be repeated again after the kick pulse applying step.

The predetermined number of kick pulses applied at the kick pulse applying step may include two kinds of pulses which are out of phase by about 90 degrees with each other. Alternatively, the predetermined number of kick pulses may include two or three kinds of pulses which are out of phase by about 60 or 120 degrees with each other.

In addition, the start rotation pulse may include a PWM pulse which is sequential for a predetermined period to control a current peak value at a predetermined value.

The rotor position search pulse may include a PWM pulse which is sequential for a predetermined period to control a current peak value at a predetermined value.

Furthermore, the rotor position may be determined at the rotor position detecting step based on either one of a response signal while a current is increasing or a response signal while a current is decreasing or both of them.

In a case where the predetermined number of rotations of the rotor is detected in the start mode, the mode may be switched from the start mode to the counter electromotive voltage feedback mode. Alternatively, in a case where it is detected that the rotation speed based on an interval of the rotation of 60 electrical degrees of the rotor reaches a predetermined value in the start mode, the mode may be switched from the start mode to the counter electromotive voltage feedback mode.

Furthermore, the first energized profile in the counter electromotive voltage mode may be controlled, according to the interval of the predetermined number of the rotations of 60 electrical degrees of the rotor in the start mode.

A comparison result of the response signal when the rotor position search pulse current reaches a predetermined value may be used in determining the rotor position at the rotor position detecting step.

Still furthermore, in a case where a response signal based on a neutral point potential with respect to the rotor position search pulse is greater than a predetermined positive threshold value or the response signal is smaller than a predetermined negative threshold value, the rotor position may be determined at the rotor position detecting step.

When it is confirmed that the rotor is rotated to the next period of 60 electrical degrees in the start mode, a counter electromotive voltage zero cross of a predetermined phase winding to be generated in a middle of the period of 60 electrical degrees is to be detected just after the mode is switched from the start mode to the counter electromotive voltage feedback mode.

Furthermore, the rotor position search pulse may be applied up to four times only at the rotor position search pulse applying step in the first round. Alternatively, the rotor position search pulse may be applied up to six times only at the rotor position search pulse applying step in the first round.

Two specified phases may be detection phases which are used to detect the response signal in order at the rotor position search pulse applying step. One specified phase and one unspecified phase other than the specified phase may be detection phases which are used to detect the response signal in order at the rotor position search pulse applying step.

Still furthermore, at the rotor position search pulse applying step, when a first detection phase of the two detection phases to detect the response signal is selected, a first rotor position search pulse may be applied between two phases other than the first detection phase in a first polarity, and then, when a second detection phase is selected, a second rotor position search pulse may be applied between two phases other than the second detection phase in the first polarity, and then, when the second detection phase is selected, a third rotor position search pulse may be applied between two phases other than the second detection phase in a second polarity opposite to the first polarity, and then, when the first detection phase is selected, a fourth rotor position search pulse may be applied between two phases other than the first detection phase in the second polarity opposite to the first polarity.

In addition, instead of the above, the first detection phase may be selected and a third rotor position search pulse may be applied between two phases other than the first detection phase in a second polarity opposite to the first polarity and then the second detection phase may be selected and a fourth rotor position search pulse may be applied between two phases other than the second detection phase in the second polarity opposite to the first polarity.

Regarding a phase which is common among the first couple of phases other than the first detection phase selected when the first rotor position search pulse is applied and the second couple of phases other than the second detection phase selected when the second rotor position search pulse is applied at the rotor position search pulse applying step, in a case where it is a current source when the first rotor position search pulse is applied, it may be a current sink when the second rotor position search pulse is applied, and in a case where it is the current sink when the first rotor position search pulse is applied, it may be the current source when the second rotor position search pulse is applied.

A peak value of the rotor position search pulse current may be controlled by an inputted torque command at the rotor position search pulse applying step.

A peak value of the start rotation pulse current may be controlled by an inputted torque command at the start rotation pulse applying step.

As a result of the rotor position searching step, the start rotation pulse applying step of applying the start rotation pulse also may serve as the rotor position search pulse applying step in the next round.

The start rotation pulse may include a sequential PWM drive pulse for a predetermined period to control the current peak value at a predetermined value.

According to the motor driving device and the motor driving method of the present invention, the response signal with respect to the applied rotor position search pulse is compared with the predetermined threshold value to determine the rotor position. In this case, there is a case where the rotor position can be immediately determined at a certain rate. Therefore, when the rotor position can be determined, the start rotation pulse current which starts the rotor can be immediately applied between the appropriate phase to be energized. Namely, according to the present invention, the start torque signal can be applied without a step of selecting all predetermined phases and then determining the rotor position. Therefore, the start period until the mode is switched from the start mode to the counter electromotive voltage feedback mode can be shortened and the start speed can be improved. In addition, since the response signal from the rotor position search pulse which is in a predetermined range is monitored, the quality of the response signal is excellent, so that the rotor position can be correctly determined. Furthermore, the above control can be implemented at low cost.

BRIEF DESCRIPTION OF THE DRAWINGS

The present invention will become readily understood from the following description of preferred embodiments thereof made with reference to the accompanying drawings, in which like parts are designated by like reference numeral and in which:

FIGS. 3A, 3B, and 3C show a timing chart of U-phase winding current, V-phase winding current and W-phase winding current, respectively when a rotor position search pulse and a start rotation pulse are applied according to the present invention, and FIG. 3D is an output result of a comparator and FIG. 3E is a rotor position determination result;

FIGS. 10A, 10B, 10C are timing chart of U-phase winding current, V-phase winding current and W-phase winding current, respectively, when a rotor position search pulse and a start rotation pulse are applied according to an embodiment 8, and FIG. 10D is an output result of a comparator and FIG. 10E is a rotor position determination result;

FIGS. 11A, 11B, 11C are timing chart of U-phase winding current, V-phase winding current and W-phase winding current, respectively, when a rotor position search pulse and a start rotation pulse are applied according to an embodiment 9, and FIG. 11D is an output result of a comparator and FIG. 11E is a rotor position determination result;

DESCRIPTION OF THE PREFERRED EMBODIMENTS

Figure 1:
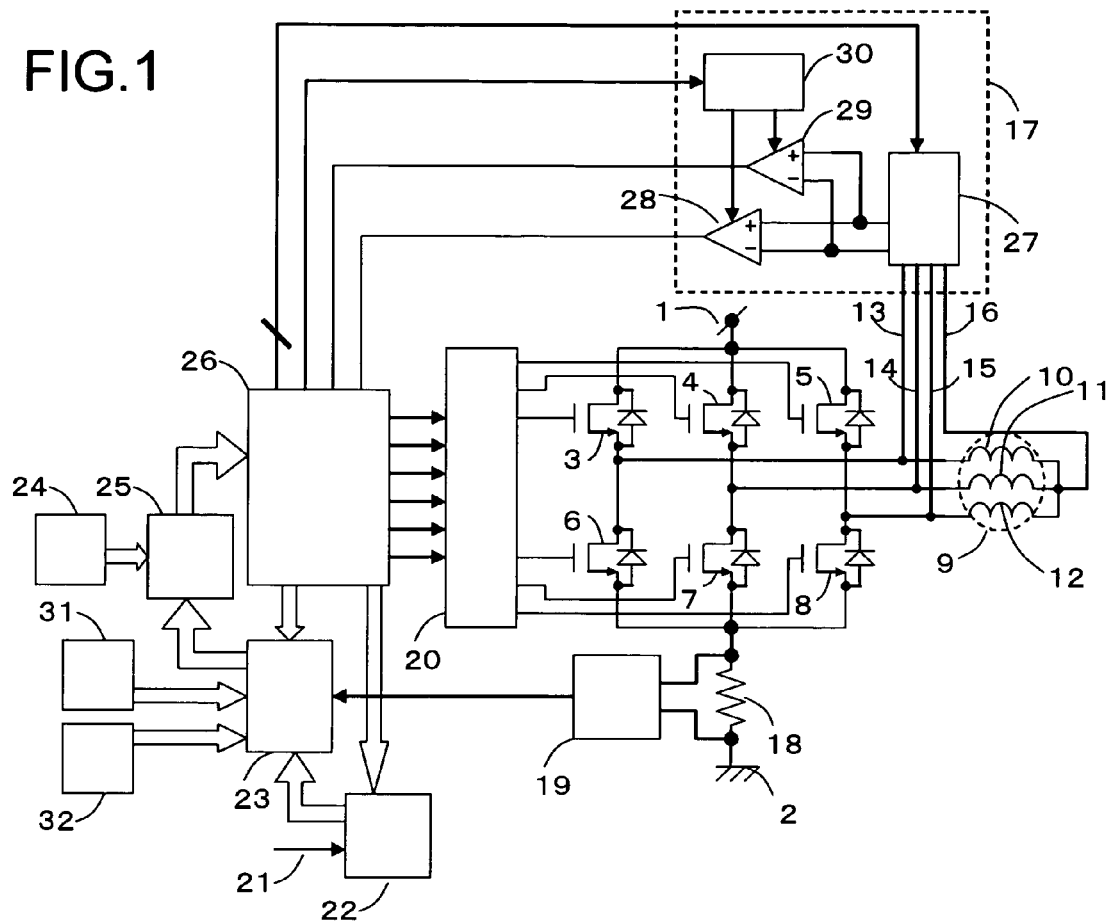
FIG. 1 is a block diagram showing a constitution of a motor driving device according to first embodiment of the present invention.

A motor driving device and a motor driving method according to embodiments of the present invention will be described with reference to the drawings hereinafter. In addition, the same reference numerals are allotted to substantially the same components in the drawings.

First Embodiment

FIG. 1 is a block diagram showing a circuit constitution of a motor driving device according to first embodiment of the present invention. Referring to FIG. 1, the motor driving device includes a high-potential power line 1, a low-potential power line 2, a U-phase high-potential drive transistor 3, a V-phase high-potential drive transistor 4, a W-phase high-potential drive transistor 5, a U-phase low-potential drive transistor 6, a V-phase low-potential drive transistor 7, a W-phase low-potential drive transistor 8, a motor 9, a U-phase motor winding 10, a V-phase motor winding 11, a W-phase motor winding 12, a U-phase terminal line 13, a V-phase terminal line 14, a W-phase terminal line 15, a neutral point terminal line 16, a phase comparison control block 17, a current detection resistor 18, a current detection amplifier 19, a pre-driver 20, an external command signal 21, a component torque generation block 22, a torque comparison block 23, a PWM on-pulse generation block 24, a PWM latch block 25, a commutation control block 26, a rotor position search pulse command generator 31, and a start pulse command generator 32. In addition, the phase comparison control block 17 includes a terminal line selection block 27, a first commutation control comparator 28, a second commutation control comparator 29 and a comparator threshold value setter 30.

This motor driving device operates in a start mode when a rotation speed is an extremely low at the time of start of the motor 9, for example, and operates in a counter electromotive voltage feedback mode which is well known in this field when a counter electromotive voltage generated by rotor rotation can be stably detected and its commutation can be controlled. The commutation control block 26 and the phase comparison control block 17 operate in collaboration with each other. Based on this, a description will be made of an operation of the motor driving device in FIG. 1.

First, a description will be made of torque control of the counter electromotive voltage feedback mode. In this mode, the rotor position search pulse command generator 31 and the start pulse command generator 32 are not used. When the component torque generation block 22 receives the external command signal 21, it generates a plurality of component torque command signals corresponding to combinations of timings and on-states of the drive transistors 3 to 8 from the commutation control block 26. The PWM on-pulse generation block 24 applies a PWM on-timing to the phase selected in the commutation control block 26. When the torque comparison block 23 receives phase information in the on-state from the commutation control block 26, it compares an output of the amplifier 19 with a signal selected from the plurality of component torque command signals, or selects one result from a plurality of compared results between the output of the amplifier 19 and component torque command signals and it generates a PWM off-pulse when the output of the current detection amplifier 19 becomes greater than the component torque command signal. When the PWM on-pulse and the PWM off-pulse are inputted to the latch block 25, a pulse width of the phase selected by the commutation control block 26 is controlled. In addition, the details of the above method is disclosed in the patent document (Japanese Unexamined Patent Publication No. 2003-174789), in which a current can be controlled even when a current flows in all three phase windings. In a case of energization at 120 degrees, the component torque generation block 22 is not necessary, and it is noted that a thin arrow in which one signal is transmitted is appropriate instead of a thick arrow in which a plurality of signals are transmitted in parallel as shown in FIG. 1.

Next, a description will be made of energized phase control in the counter electromotive voltage feedback mode. As described above, this method is well known in this field. The commutation control block 26 controls the energization so that while a polarity of the counter electromotive voltage of a certain winding of the three phase windings is expected to be changed, the current of that winding may become zero. In the winding in which a current is zero, a time-varying component of the current becomes also zero after a short time, while the counter electromotive voltage is generated between both terminals of the winding, that is, between the U-phase terminal line 13 and the neutral point terminal line (common terminal) 16, or between the V-phase terminal line 14 and the neutral point terminal line 16, or between the W-phase terminal line 15 and the neutral point terminal (common terminal) line 16 by an interaction between the winding and a magnetic flux of the rotating rotor, then, a rotor position can be correctly recognized by detecting the timing of the polarity change of the counter electromotive voltage (zero cross timing). In this counter electromotive voltage feedback mode, the comparator threshold value setter 30 sets some amount of offset when both first commutation control comparator 28 and second commutation control comparator 29 or either one of them compares differential input signals. This offset varies the outputs of the comparators 28 and 29 according to whether a potential difference between the differential input signals reaches a predetermined value or not. In other words, this offset serves as a threshold value with respect to the differential input signals of the comparator and prevents the zero cross timing from being affected by chattering. When the zero cross timing of the potential difference of the winding in which a current and its time variation are zero is selected through the terminal line selection block 27 and it is fed back to the commutation control block 26 through the first and second commutation control comparators 28 and 29, the commutation control block 26 can sequentially control the correct commutation timing. In addition, when to prevent the chattering is a purpose, a latch circuit may only have to be provided in the commutation control block 26 without having to provide the offset (threshold value). In this case, the second commutation control comparator 29 and the comparator threshold value setter 30 are not needed. In addition, when both first commutation control comparator 28 and second commutation control comparator 29 or either one of them is previously prepared for each phase winding, the terminal line selection block 27 is not needed. When the terminal line selection block 27 is provided, the comparator can be used in both start mode and counter electromotive voltage feedback mode.

Furthermore, a description will be made of the start mode. When the rotor is just after started and it exists in the extremely low rotation region, the operation is performed in the start mode. In the start mode, a step of applying a search pulse and a step of searching a rotor position and a step of applying a torque current pulse to a suitable stator to apply a start rotation torque to the rotor whose position is determined are repeated for acceleration. In the start mode, the commutation control block 26 selects two terminals from the U-phase terminal, the V-phase terminal and the W-phase terminal of the three phase windings and applies the rotor position search pulse to those terminals. A description will be made of a response signal when the rotor position search pulse is applied with reference to FIG. 2 hereinafter. In addition, the horizontal axis designates an electrical angle in which the rotor is locked when a stationary current is applied from the U-phase terminal to the V-phase terminal at 150 degrees. The same applies to descriptions in FIGS. 3, 5 and 7.

Figure 2:
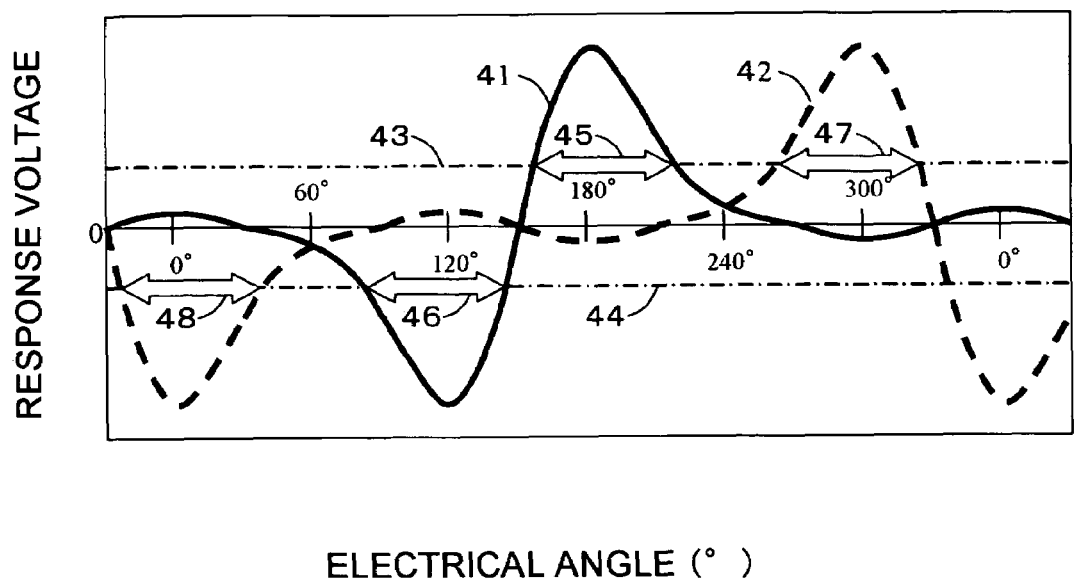
FIG. 2 is a view showing characteristics of a response voltage in a W-phase winding with respect to a rotor position when a rotor search pulse is applied between a U-phase winding and a V-phase winding.

FIG. 2 is a view showing a relation between the electrical angle of the previously provided rotor position and the response voltage when the search pulse is applied between the U-phase winding and the V-phase winding. A curved line 41 showing the relation between the electrical angle of the rotor position and the response voltage in FIG. 2 is provided as follows.

(a) First, the rotor is set at a position whose electrical angle is varied by predetermined electrical degrees.

(b) Then, when the drive transistor 3 and the drive transistor 7 shown in FIG. 1 are selectively turned on by the commutation control block 26, the rotor position search pulse current flows through the high-potential power supply line 1, to the drive transistor 3, the U-phase winding 10, the neutral point terminal (common terminal) 16, the V-phase winding 11, the drive transistor 7, the current detection resistor 18, and the low-potential power supply line 2 in this order.

(c) Then, a response voltage generated between the W-phase terminal line 15 of the W-phase winding having a zero current and the neutral point terminal line 16 is measured and it is provided as the response voltage corresponding to the electrical angle of the set rotor position.

(d) Then, the electrical angle of the rotor position is varied by predetermined degrees in the above operation (a), and the above operations (b) and (c) are repeated. Thus, the variations in response voltage corresponding to the electrical degrees of the rotor positions can be provided as the curved line 41 shown in FIG. 2. In addition, although the variations in response voltage corresponding to the electrical degrees of the rotor positions is shown as the curved line 41 in FIG. 2, it is provided by connecting points of the response voltages provided at the predetermined electrical degrees in practice as described above.

Another curved line 42 in FIG. 2 will be described below.

Next, a description will be made of a method of detecting the rotor position from the measured response voltage using the curved line 41 which shows the relation between the electrical degrees of the rotor position and the response voltage in FIG. 2. As shown in FIG. 2, according to the curved line 41 showing the relation between the electrical degrees of the rotor position and the response voltage, although an absolute value of the response voltage is increased at around 120 electrical degrees (region 46) and 180 electrical degrees (region 45), the response voltage is hardly detected in other regions. Thus, it can be seen that the rotor position can be specified, based on the measured response voltage, when it is positioned at around 120 electrical degrees or 180 electrical degrees. However, since the electrical degree of the rotor position does not always correspond one-on-one with the response voltage, the rotor position has to be specified only at the response voltage having a predetermined absolute value or more. Thus, a positive threshold value 43 and a negative threshold value 44 are set previously, then, it is determined that the rotor position is at around 180 electrical degrees when the response voltage is the positive threshold value 43 or more (H level signal), and it is determined that the rotor position is at around 120 electrical degrees when the response voltage is the negative threshold value 44 or less (L level signal).

Furthermore, a curved line 42 showing the relation between the electrical angle of the rotor position and the response voltage in FIG. 2 is provided as follows.

(a) First, the rotor is set at a position whose electrical angle is varied by predetermined electrical degrees.

(b) Then, when the drive transistor 4 and the drive transistor 6 are turned on by the commutation control block 26, the rotor position search pulse current flows through the high-potential power supply line 1, to the drive transistor 4, the V-phase winding 11, the neutral point terminal 16, the U-phase winding 10, the drive transistor 6, the current detection resistor 18, and the low-potential power supply line 2 in this order.

(c) Then, a response voltage generated between the W-phase terminal line 15 of the W-phase winding having a zero current and the neutral point terminal line 16 is measured and it is provided as the response voltage corresponding to the electrical angle of the set rotor position.

(d) Then, the electrical angle of the rotor position is varied at predetermined degrees in the above operation (a), and the above operations (b) and (c) are repeated. Thus, the variations in response voltage corresponding to the electrical degrees of the rotor positions can be provided as the curved line 42 shown in FIG. 2. In addition, although the variations in response voltage corresponding to the electrical degrees of the rotor positions is shown as the curved line 42 in FIG. 2, it is provided by connecting points of the response voltages provided at the predetermined electrical degrees in practice as described above.

Next, a description will be made of a method of detecting the rotor position from the measured response voltage using the curved line 42 which shows the relation between the electrical angle of the rotor position and the response voltage in FIG. 2. As shown in FIG. 2, according to the curved line 42 showing the relation between the electrical degrees of the rotor position and the response voltage, although an absolute value of the response voltage is increased at around 0 electrical degrees (region 48) and 300 electrical degrees (region 47), the response voltage is hardly detected in other regions. Thus, it can be seen that the rotor position can be specified, based on the measured response voltage, when it is positioned at around 0 electrical degrees or 300 electrical degrees. In this case also, similar to the above curved line 41, the rotor position has to be specified only at the response voltage having a predetermined absolute value or more. Here, the same positive threshold value 43 and the same negative threshold value 44 as those of the above curved line 41 are set. Thus, it is determined that the rotor position is at around 300 electrical degrees when the response voltage is the positive threshold value 43 or more (H level signal), and it is determined that the rotor position is at around 0 electrical degrees when the response voltage is the negative threshold value 44 or less (L level signal).

Figure 7:
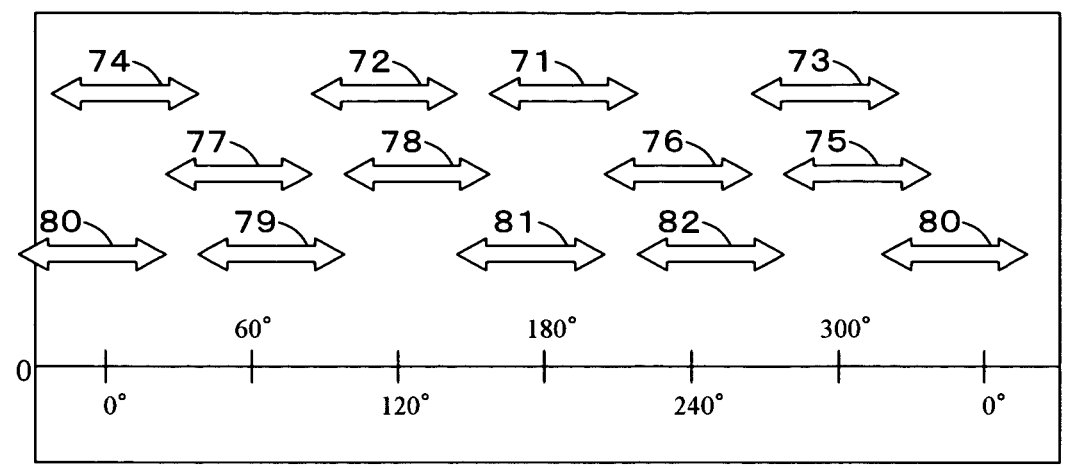
FIG. 7 is a view showing regions of the rotor positions which can be detected by applying the rotor position search pulse to two phases selected from three phases and using a response voltage between one phase which was not selected and a neutral point terminal.

FIG. 7 shows regions of the rotor positions which can be detected by selecting two phases among the three phases and applying the rotor position search pulse thereto and measuring the response voltage generated between one phase which is not selected and the neutral point terminal. More specifically, upper regions 71 to 74 of the rotor positions are detected when the rotor position search pulse is applied between the U-phase winding and the V-phase winding (FIG. 2), and middle regions 75 to 78 of the rotor positions are detected when the rotor position search pulse is applied between the V-phase winding and the W-phase winding, and lower regions 79 to 82 of the rotor positions are detected when the rotor position search pulse is applied between the W-phase winding and the U-phase winding. Since each of the regions 71 to 82 in FIG. 7 shows a region of almost 60 electrical degrees, it is called a period of 60 electrical degrees.

Figure 14:
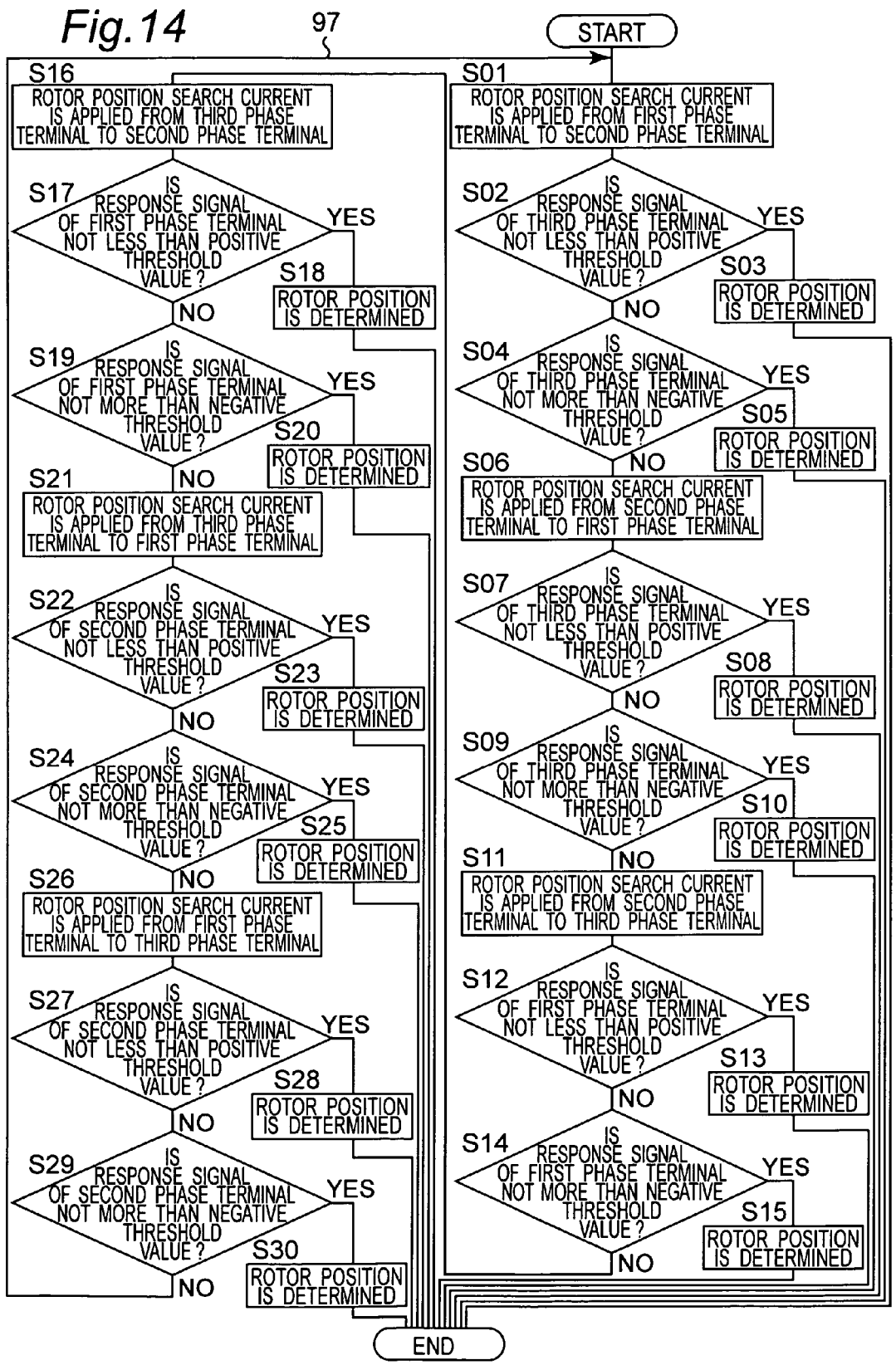
FIG. 14 is a flowchart showing a rotor position searching process in a motor driving method according to the first embodiment of the present invention.

FIG. 14 is a flowchart showing rotor position searching steps of the motor driving method according to the first embodiment of the present invention.

A description will be made of steps of detecting the rotor position from the measured response voltage with reference to the flowchart of FIG. 14 hereinafter.

(a) First, the commutation control block 26 turns on the drive transistor 3 and the drive transistor 7, and the rotor position search pulse current is applied from the U-phase winding 10 to the V-phase winding 11 through the neutral point terminal at step S01.

(b) Then, the comparator threshold value setter 30 applies the predetermined positive threshold value 43 to the first commutation control comparator 28, and applies the predetermined negative threshold value 44 to the second commutation control comparator 29. At this time, the W-phase terminal line 15 and the neutral point terminal line 16 are inputted from the terminal line selection block 27 to a non-converted input terminal and a converted input terminal of the comparators 28 and 29 by the commutation control block 26.

(c) Then, the output of the comparator 28 is compared with the positive threshold value 43 and it is determined whether it is not less than the positive threshold value 43 at step S02. When the output is not less than the positive threshold value 43, that is, when the H level signal is outputted, it can be found that the rotor position is positioned at around 180 electrical degrees in the region 45 in FIG. 2 at step S03.

(d) Meanwhile, the output of the comparator 29 is compared with the negative threshold value 44 and it is determined whether it is not more than the negative threshold value 44 at step S04. When the output is not more than the negative threshold value 44, that is, when the L level signal is outputted, it can be found that the rotor position is positioned at around 120 electrical degrees in the region 46 in FIG. 2 at step S05.

(e) When the outputs of the comparators 28 and 29 are neither the H level signal nor L level signal, it is estimated that the rotor is positioned at other angle.

(f) Here, when the drive transistors 4 and 8 are turned on for the rotor positioned at 180 electrical degrees, a preferable start rotation torque can be applied thereto, and when the drive transistors 3 and 8 are turned on for the rotor positioned at 120 electrical degrees, a preferable start rotation torque can be applied thereto.

Similarly, another combination of the two terminals is selected and the rotor position search pulse is applied thereto, so that the rotor position at another angle can be detected. A description will be made of a case where the current is applied from the V-phase winding 11 to the U-phase winding 10.

(a) First, the commutation control block 26 turns on the drive transistor 4 and the drive transistor 6, and the rotor position search pulse current is applied from the V-phase winding 11 to the U-phase winding 10 through the neutral point terminal at step S06.

(b) Then, the comparator threshold value setter 30 applies the predetermined positive threshold value 43 to the first commutation control comparator 28, and applies the predetermined negative threshold value 44 to the second commutation control comparator 29. At this time, the W-phase terminal line 15 and the neutral point terminal line 16 are inputted from the terminal line selection block 27 to the non-converted input terminal and the converted input terminal of the comparators 28 and 29 by the commutation control block 26.

(c) Then, the output of the comparator 28 is compared with the positive threshold value 43 and it is determined whether it is not less than the positive threshold value 43 at step S07. When the output is not less than the positive threshold value 43, that is, when the H level signal is outputted, it can be found that the rotor position is positioned at around 300 electrical degrees in the region 47 in FIG. 2 at step S08.

(d) Meanwhile, the output of the comparator 29 is compared with the negative threshold value 44 and it is determined whether it is not more than the negative threshold value.44 at step S09. When the output is not more than the negative threshold value 44, that is, when the L level signal is outputted, it can be found that the rotor position is positioned at around 0 electrical degree in the region 48 in FIG. 2 at step S10.

(e) When the outputs of the comparators 28 and 29 are neither the H level signal nor L level signal, it is estimated that the rotor is positioned at other angle. In this case, a combination of two terminals other than the combination of the U-phase terminal and the V-phase terminal is selected and the rotor position search pulse is applied between the selected two terminals.

(f) Here, when the drive transistors 5 and 6 are turned on for the rotor determined to be positioned at 300 electrical degrees at the step S08, a preferable start rotation torque can be applied thereto and when the drive transistors 5 and 7 are turned on for the rotor determined to be positioned at 0 electrical degree at the step S10, a preferable start rotation torque can be applied thereto.

Then, a description will be made of a case where a current is applied from the V-phase winding 11 to the W-phase winding 12.

(a) First, the commutation control block 26 turns on the drive transistor 4 and the drive transistor 8, and the rotor position search pulse current is applied from the V-phase winding 11 to the W-phase winding 12 through the neutral point terminal at step S11.

(b) Then, the terminal line selection block 27 is controlled to input the U-phase terminal line 13 and the neutral point terminal line 16 to the non-converted input terminal and the converted input terminal of the comparators 28 and 29.

(c) Then, the output of the comparator 28 is compared with the positive threshold value 43 and it is determined whether it is not less than the positive threshold value 43 at step S12. When the output is not less than the positive threshold value 43, that is, when the H level signal is outputted, it can be found that the rotor position is positioned at around 300 electrical degrees at step S13.

(d) Meanwhile, the output of the comparator 29 is compared with the negative threshold value 44 and it is determined whether it is not more than the negative threshold value 44 at step S14. When the output is not more than the negative threshold value 44, that is, when the L level signal is outputted, it can be found that the rotor position is positioned at around 240 electrical degrees at step S15.

(e) When the outputs of the comparators 28 and 29 are neither the H level signal nor L level signal, it is estimated that the rotor is positioned at another angle. In this case, another combination of the high-potential drive transistor and the low-potential drive transistor is turned on by the commutation control block 26 to select another combination of the two terminals and the search pulse applying step and the rotor position searching step are continued.

Then, A description will be made of a case where a current is applied from the W-phase winding 12 to the V-phase winding 11.

(a) First, the commutation control block 26 turns on the drive transistor 5 and the drive transistor 7, and the rotor position search pulse current is applied from the W-phase winding 12 to the V-phase winding 11 through the neutral point terminal at step S16.

(b) Then, the terminal line selection block 27 is controlled to input the U-phase terminal line 13 and the neutral point terminal line 16 to the non-converted input terminal and the converted input terminal of the comparators 28 and 29.

(c) Then, the output of the comparator 28 is compared with the positive threshold value 43 and it is determined whether it is not less than the positive threshold value 43 at step S17. When the output is not less than the positive threshold value 43, that is, when the H level signal is outputted, it can be found that the rotor position is positioned at around 60 electrical degrees at step S18.

(d) Meanwhile, the output of the comparator 29 is compared with the negative threshold value 44 and it is determined whether it is not more than the negative threshold value 44 at step S19. When the output is not more than the negative threshold value 44, that is, when the L level signal is outputted, it can be found that the rotor position is positioned at around 120 electrical degrees at step S20.
(e) When the outputs of the comparators 28 and 29 are neither the H level signal nor L level signal, it is estimated that the rotor is positioned at another angle. In this case, another combination of the high-potential drive transistor and the low-potential drive transistor is turned on by the commutation control block 26 to continue the rotor position searching.

Then, a description will be made of a case where a current is applied from the W-phase winding 12 to the U-phase winding 10.
(a) First, the commutation control block 26 turns on the drive transistor 5 and the drive transistor 6, and the rotor position search pulse current is applied from the W-phase winding 12 to the U-phase winding 10 through the neutral point terminal at step S21.
(b) Then, the terminal line selection block 27 is controlled to input the V-phase terminal line 14 and the neutral point terminal line 16 to the non-converted input terminal and the converted input terminal of the comparators 28 and 29.
(c) Then, the output of the comparator 28 is compared with the positive threshold value 43 and it is determined whether it is not less than the positive threshold value 43 at step S22. When the output is not less than the positive threshold value 43, that is, when the H level signal is outputted, it can be found that the rotor position is positioned at around 60 electrical degrees at step S23.
(d) Meanwhile, the output of the comparator 29 is compared with the negative threshold value 44 and it is determined whether it is not more than the negative threshold value 44 at step S24. When the output is not more than the negative threshold value 44, that is, when the L level signal is outputted, it can be found that the rotor position is positioned at around 0 electrical degree at step S25.
(e) When the outputs of the comparators 28 and 29 are neither the H level signal nor L level signal, it is estimated that the rotor is positioned at another angle. In this case, another combination of the high-potential drive transistor and the low-potential drive transistor is turned on by the commutation control block 26 to continue the rotor position searching.

Then, a description will be made of a case where a current is applied from the U-phase winding 10 to the W-phase winding 12.
(a) First, the commutation control block 26 turns on the drive transistor 3 and the drive transistor 8 and the rotor position search pulse current is applied from the U-phase winding 10 to the W-phase winding 12 through the neutral point terminal at step S26.
(b) Then, the terminal line selection block 27 is controlled to input the V-phase terminal line 14 and the neutral point terminal line 16 to the non-converted input terminal and the converted input terminal of the comparators 28 and 29.
(c) Then, the output of the comparator 28 is compared with the positive threshold value 43 and it is determined whether it is not less than the positive threshold value 43 at step S27. When the output is not less than the positive threshold value 43, that is, when the H level signal is outputted, it can be found that the rotor position is positioned at around 180 electrical degrees at step S28.
(d) Meanwhile, the output of the comparator 29 is compared with the negative threshold value 44 and it is determined whether it is not more than the negative threshold value 44 at step S29. When the output is not more than the negative threshold value 44, that is, when the L level signal is outputted, it can be found that the rotor position is positioned at around 240 electrical degrees at step S30.
(e) When the outputs of the comparators 28 and 29 are neither the H level signal nor L level signal, it is estimated that the rotor is positioned at another angle. In this case, another combination of the high-potential drive transistor and the low-potential drive transistor is turned on by the commutation control block 26 to continue the rotor position searching.

Thus, the description has been made of the case where the rotor position is detected by applying six kinds of rotor position search pulses including the application polarities, and the rotor position can be determined with high precision from the response signal level by applying the six kinds of rotor position search pulses in general. In addition, the first, second and third phases shown in FIG. 14 do not correspond to U phase, V phase and W phase, respectively, and they may be chosen from the U phase, V phase and W phase so as not to be overlapped with each other. Although the rotor position searching step shown in FIG. 14 includes six rotor position searches, when the rotor position is determined, the step is completed at that point. In addition, although flow in FIG. 14 may be used for six rotor position searches, it is preferable that the flow is used only for the first rotor position search pulse applying step in view of efficiency as will be described below.

Figure 15:
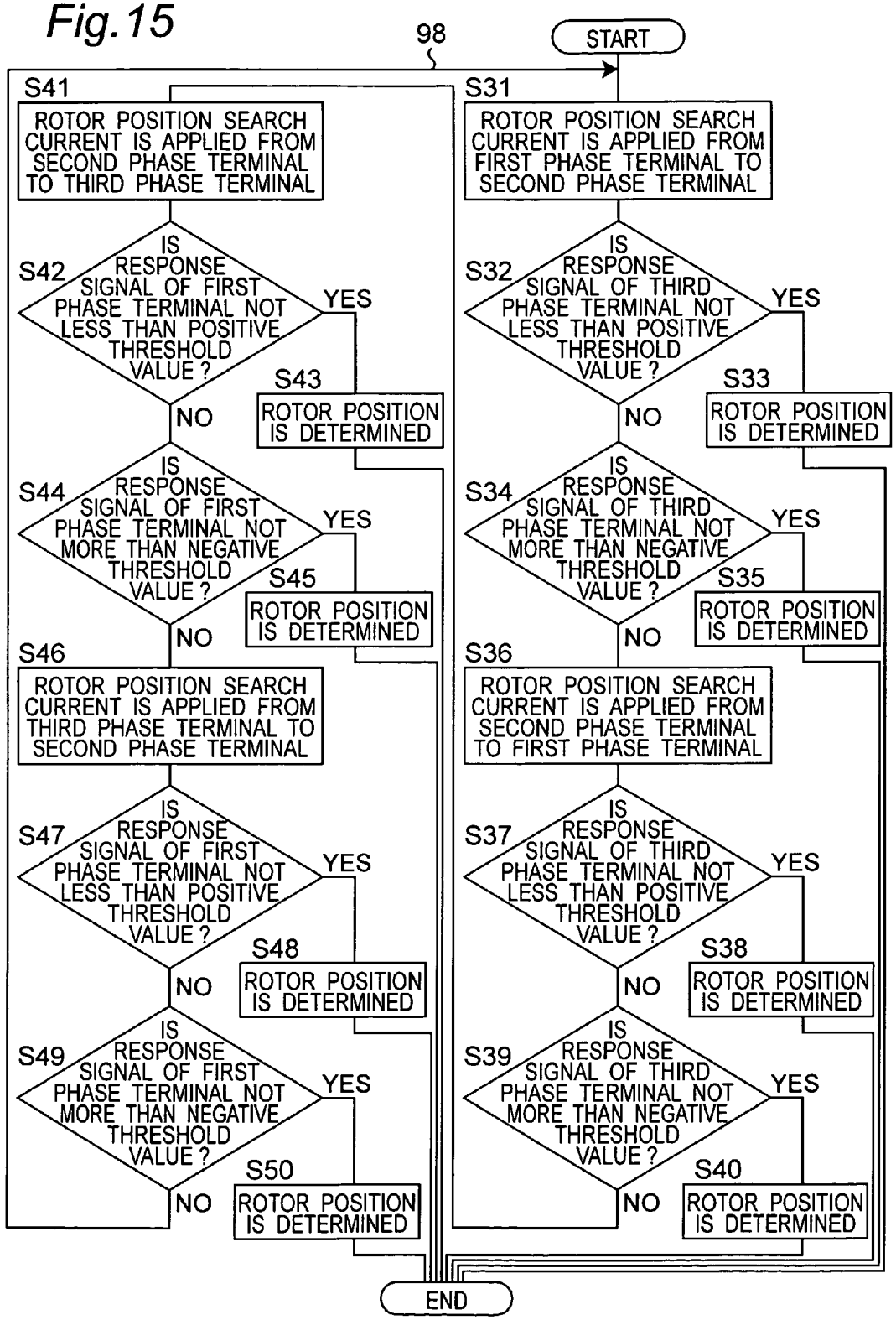
FIG. 15 is another example of the flowchart showing the rotor position searching process in the motor driving method according to the first embodiment of the present invention.
Figure 16:
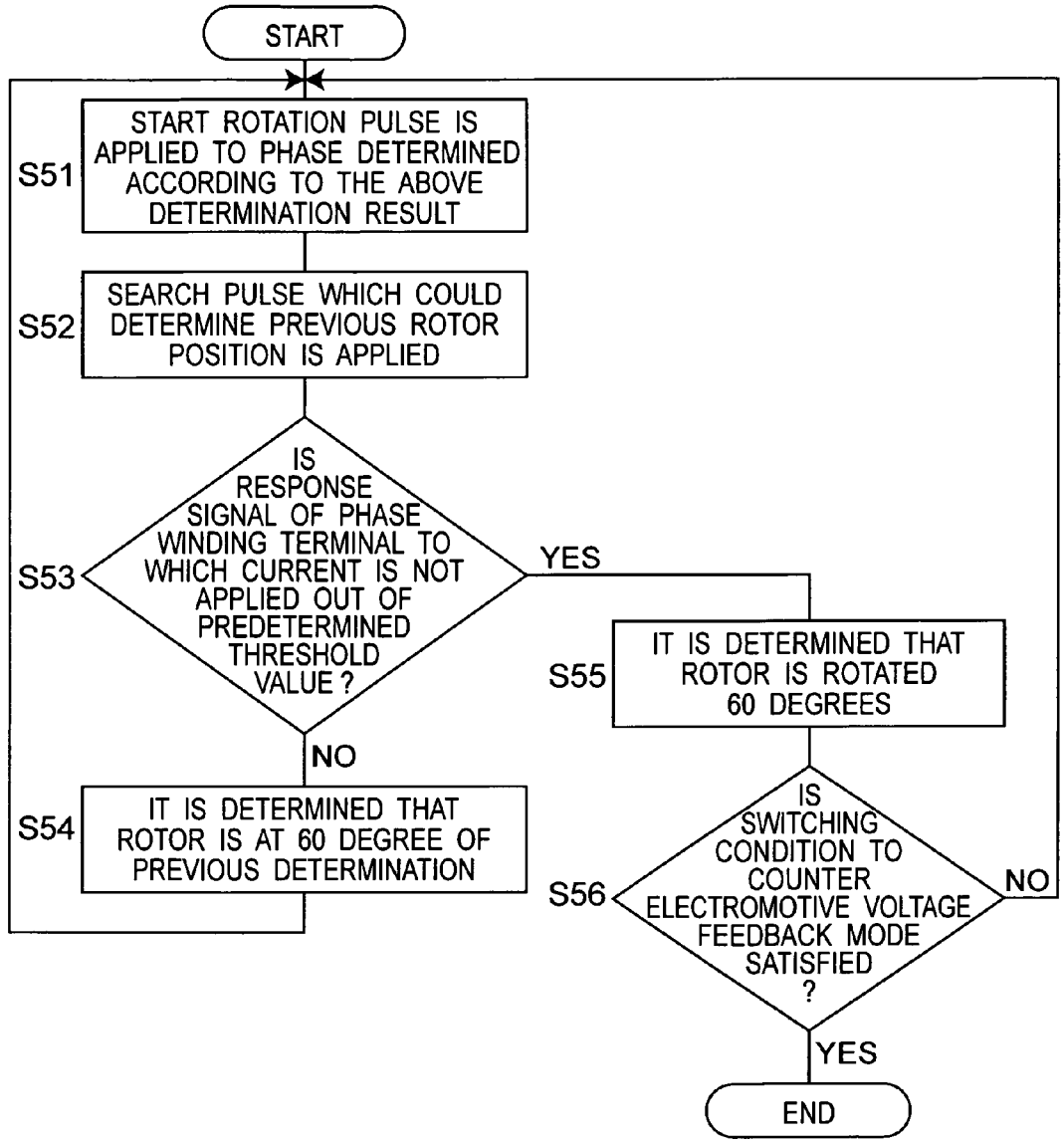
FIG. 16 is a flowchart showing steps after the first start rotation torque applying step in a start mode according to the motor driving method according to the first embodiment of the present invention.

Furthermore, as shown in a flowchart in FIG. 15, the rotor position can be determined from the response signal level by applying four kinds of rotor position search pulses to reduce redundancy. The flowchart shown in FIG. 15 is a different example of the rotor position searching step in the motor driving method according to the first embodiment of the present invention. Since the steps S31 to S50 of the flowchart in FIG. 15 are substantially the same as the steps S01 to S20 of the flowchart shown in FIG. 14, their description will be omitted. The first, second and third phases in FIG. 15 may be chosen from the U phase, V phase and W phase so as not to be overlapped with each other. Although the rotor position searching step shown in FIG. 15 includes four rotor position searches when the rotor position is determined, the step is completed at that point. In addition, although the flow in FIG. 15 may be used for four rotor position searches, it is preferable that the flow is used only in the first rotor position search pulse applying step in view of efficiency as will be described below. After the flow in FIG. 15 is completed, a flow shown in FIG. 16 is started. In addition, after the flow in FIG. 16 is completed, the well-known counter electromotive voltage mode is started.

FIG. 16 is a flowchart which starts from a first start rotation pulse applying step and ends when a switching condition to the counter electromotive voltage feedback mode is satisfied. After the flow in FIG. 14 is completed, the flow in FIG. 16 is started.
(a) First, the start rotation pulse is applied between the phase provided based on the result of the rotor position by the rotor position search at step S51.
(b) Then, the search pulse under the same condition as the rotor position search pulse applied when the rotor position could be determined is applied at step S52.
(c) It is determined whether the response signal from the winding terminal of the phase to which the search pulse current was not applied is out of the predetermined threshold value (which is neither H level signal nor L level signal, that is, state 0) or not at step S53. When the response signal is the same as that last time (NO: state P or state N), it is determined that the rotor exists during a period of 60 electrical degrees which was determined last time at S54. Then, the operation returns to the step S51.

(d) Meanwhile, when it is determined that the response signal is the state 0 (YES) at the step S53, it is determined that the rotor is rotated to the next period of 60 electrical degrees at step S55 and it is determined whether the counter electromotive voltage feedback mode switching condition is satisfied or not at step S56. When the counter electromotive voltage feedback mode switching condition is satisfied, the flowchart is completed and the mode is shifted to the well-known counter electromotive voltage feedback mode. Meanwhile, when the switching condition is not satisfied, the operation returns to the step S51.

The phases to which the start rotation pulse is applied when the rotor position is at 0 electrical degree, 120 electrical degrees, 180 electrical degrees and 300 electrical degrees have been already described. When it is determined that the electrical angle of the rotor position is at around 60 degrees, a preferable start rotation torque can be applied by turning on the drive transistor 3 and the drive transistor 7. Meanwhile, when it is determined that the electrical degree of the rotor position is at around 240 degrees, a preferable start rotation torque can be applied by turning on the drive transistor 4 and the drive transistor 6. According to this method, when the first response result from the first rotor position search pulse is such that the output of the comparator 28 is the H level signal or the output of the comparator 29 is L level signal, the rotor position can be immediately determined without waiting for the response of the rotor position search pulse applied between the other windings. Thus, since unnecessary search pulse application which does not contribute to the rotor start torque can be omitted, and the predetermined start pulse is applied, prompt start acceleration can be implemented in total.

FIGS. 3A to 3E show an example of a timing chart in which behaviors of application of the rotor position search pulse and the start rotation pulse are schematically shown. In FIGS. 3A to 3E, the horizontal axis designates a time, and FIGS. 3A, 3B and 3C designate a U-phase winding current, a V-phase winding current and a W-phase winding current in the vertical axes, respectively, and FIG. 3D designates an output result of the comparator 28 or the comparator 29, and FIG. 3E designates a determined result of the rotor position. Reference character P designates a state in which the output of the comparator 28 is the H level signal and reference character N designates a state in which the output of the comparator 29 is the L level signal and reference character O designates a state in which the output of the comparator 28 is not the H level signal and the output of the comparator 29 is not the L level signal in FIG. 3D. In addition, numerals 240, 300, 0 and 60 in FIG. 3E designate that the determined result of the rotor position are at around 240 electrical degrees, 300 electrical degrees, 0 electrical degrees and 60 electrical degrees, respectively.

In FIGS. 3A to 3E, at a first step DS1 for applying the rotor position search pulse to search the rotor position, the pulses are applied three times. More specifically, at the step DS1, the rotor position search pulse is applied from the U-phase winding 10 to the V-phase winding 11 first, it is applied from the V-phase winding 11 to the U-phase winding 10 secondly and it is applied from the V-phase winding 11 to the W-phase winding 12 thirdly. Although the rotor position could not be searched by the first and second application of the rotor position search pulse, the output of the second commutation control comparator 29 becomes the L level signal (state N) at the third application of the rotor position search pulse, so that it is determined that the rotor position is at 240 degrees. The rotor position search pulse condition at the time is stored and the drive transistors 4 and 6 are turned on to apply the appropriate torque to the rotor and the start rotation pulse is applied at a step SP1 for applying the start rotation pulse.

At a second step DS2 for applying the rotor position search pulse in FIGS. 3A to 3E, the search pulse under the same condition as that stored last time is applied. Since the rotation speed is low at the time of start in general, a frequency of generation of the rotor rotation to the next period of 60 electrical degrees is sufficiently smaller than the number of rotor position searches. Thus, since the L level signal (state N) can be immediately provided as the output of the second commutation control comparator 29 at the step DS2 for applying the rotor position search pulse, the same rotor position as the last one can be determined to be at 240 electrical degrees. The search pulse condition at this time is stored and the drive transistors 4 and 6 are turned on to apply a proper torque to the rotor, and the start rotation pulse is applied at step SP2.

Similarly, the rotor position search pulses are applied at third and fourth steps DS3 and DS4 in FIGS. 3A to 3E, so that the drive transistors 4 and 6 are turned on based on the determination results of the rotor positions, so that the start rotation pulses are applied at third and fourth steps SP3 and SP4.

At a fifth step DS5 for applying the rotor position search pulse in FIGS. 3A to 3E, the rotor position search pulses are applied two times. As the first rotor position search pulse application, although the same rotor position search pulse as that used at the step DS4 and stored last time is applied, the L level signal cannot be provided as the output of the second commutation control comparator 29. Thus, as the second rotor position search pulse application, the drive transistors 4 and 6 are turned on so that the rotor can be searched at 300 degrees which is rotated from 240 degrees of the rotor position detected last time by 60 degrees. In this case, the current is applied from the V-phase winding 11 to the U-phase winding 10. At this time, the output of the first commutation control comparator 28 becomes the H level signal (state P), and the rotor position is determined to be at 300 degrees. The search pulse condition at this time is stored and the drive transistors 5 and 6 are turned on to apply a proper torque to the rotor and the start rotation pulse is applied at a step SP5.

At sixth and seventh steps DS6 and DS7 for applying the rotor position search pulse in FIGS. 3A to 3E, the same search pulse as the rotor position search pulse secondly applied at the step DS5 is applied and the rotor position is determined to be at 300 electrical degrees. Thus, the same start rotation pulse as that at the step SP5 is applied at sixth and seventh start rotation pulse applying steps SP6 and SP7.

At an eighth step DS8 for applying the rotor position search pulse in FIGS. 3A to 3E, the rotor position search pulse is applied two times in result. As the first rotor position search pulse application, although the same rotor position search pulse as that used at the step DS7 and stored last time is applied, the H level signal cannot be provided as the output of the first commutation control comparator 28. Thus, as the second rotor position search pulse application, the drive transistors 5 and 6 are turned on so that the rotor can be searched at 360 degrees, that is, 0 degree which is rotated from 300 degrees of the rotor position detected last time by 60 degrees. In this case, the current is applied from the W-phase winding 12 to the U-phase winding 10. At this time, the output of the second commutation control comparator 29 becomes the L level signal (state N), and the rotor position is determined to be at 0 degree. The search pulse condition at this time is stored and the drive transistors 5 and 7 are turned on to apply a proper torque to the rotor and the start rotation pulse is applied at a start rotation pulse applying step SP8.

At ninth step DS9 for applying the rotor position search pulse in FIGS. 3A to 3E, the same search pulse as the rotor position search pulse secondly applied at the step DS8 is applied and the rotor position is determined to be at 300 electrical degree. Thus, the same start rotation pulse as that at the step SP8 is applied at a ninth start rotation pulse applying step SP9.

At a tenth step DS10 for applying the rotor position search pulse in FIGS. 3A to 3E, the rotor position search pulses are applied two times in result. As the first rotor position search pulse application, although the same rotor position search pulse as that used at the step DS9 and stored last time is applied, the L level signal cannot be provided as the output of the second commutation control comparator 29. Thus, as the second rotor position search pulse application, the drive transistors 5 and 7 are turned on so that the rotor can be searched at around 60 degrees which is rotated from 0 degree of the rotor position detected last time by 60 degrees. In this case, the current is applied from the W-phase winding 12 to the V-phase winding 11. At this time, the output of the first commutation control comparator 28 becomes the H level signal (state P), and the rotor position is determined to be at around 60 degrees.

Here, the first rotation of the rotor by 60 electrical degrees from the first rotor position search pulse applying step DS1 is confirmed at the fifth rotor position search pulse applying step DS5, the second rotation of the rotor by 60 electrical degrees is confirmed at the eighth rotor position search pulse applying step DS8, and finally the third rotation of the rotor by 60 electrical degrees is confirmed at the tenth rotor position search pulse applying step DS10. When it is determined that the rotation start can be started well after three rotations of the rotor by 60 electrical degrees, a normal acceleration torque is applied thereafter, so that the counter electromotive voltage can be used as a method of detecting the rotor position. As shown in a current waveform AP1, the drive transistors 3 and 7 are turned on to control the current with PWM. Since the rotor is rotated afterwards, the motor can be driven by detecting the rotor position using the well-known counter electromotive voltage as described above.

In addition, although it is determined that the rotation has been started after the three times of rotations of the rotor by 60 electrical degrees in the above case, the number of times may be other than three. In addition, it may be determined that the rotation has normally started when a rotation speed obtained from the interval of the rotation by 60 electrical degrees in the start rotation pulse current reaches a predetermined value.

In addition, when the acceleration torque is applied just after the mode is changed from the start mode to the counter electromotive voltage feedback mode, a current zero period for forming its profile and detecting the zero cross of the counter electromotive voltage is provided at a timing in which the zero cross of the counter electromotive voltage is previously estimated from the motor rotation frequency of each 60 electrical degrees in the start mode. In FIGS. 3A to 3E, a zero cross after the AP1 is to be detected. When a region of 60 electrical degrees is determined as the rotor position, the zero cross in which the counter electromotive voltage of the W-phase winding is changed from positive to negative is detected at a center timing in the region of 60 electrical degrees, for example. In a case where the predetermined zero cross is not generated when the zero cross detecting period is started, the zero cross at 60 electrical degrees is detected when it is generated. In other words, in the case where the counter electromotive voltage of the W-phase winding is positive when the counter electromotive voltage detecting period is started, the zero cross detecting period is continued until the predetermined zero cross is generated. Then, when the predetermined zero cross is generated, it is determined that the zero cross is generated. In a case where it is determined that the predetermined zero cross is already generated when the counter electromotive voltage zero cross detecting period is started based on the polarity of the counter electromotive voltage signal, the zero cross generation is detected at a point when the counter electromotive voltage zero cross detecting period is started. Namely, in the case where the counter electromotive voltage of the W-phase winding is already negative when the detecting period is started, the zero cross is detected immediately at that point.

Figure 4A:
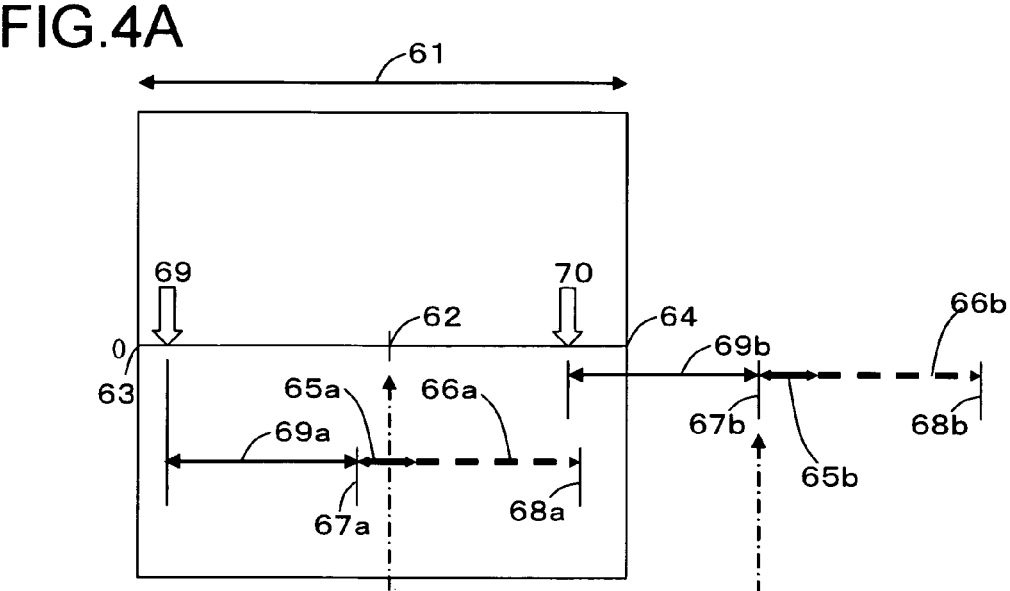
FIG. 4A is an explanatory diagram showing a timing to detect a counter electromotive voltage zero cross.
Figure 4B:
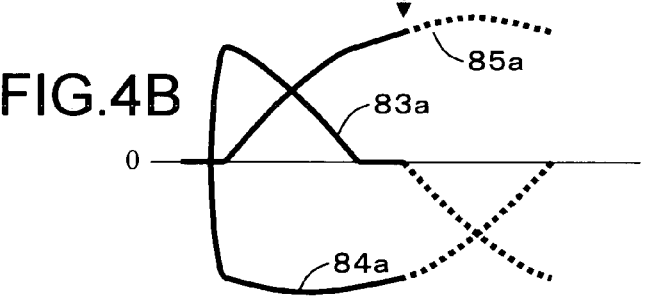
FIGS. 4B and 4C are views showing current profiles when the rotor positions just after the mode is shifted to a counter electromotive voltage feedback mode are at different timings.
Figure 4C:
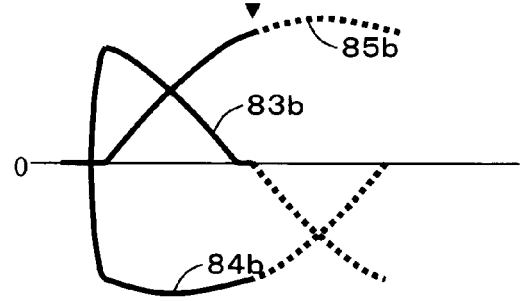

The zero cross detection of the counter electromotive voltage will be described in more detail with reference to FIGS. 4A to 4C. FIG. 4A is an explanatory diagram showing a timing for detecting the counter electromotive voltage zero cross, and FIGS. 4B and 4C show current profiles when the rotor position just after the mode is changed to the counter electromotive voltage feedback mode is at timings 69 and 70, respectively. The horizontal axis in the drawing designates a rotor position or a time. According to FIG. 4A, any one of the six kinds of periods of 60 electrical degrees shown in FIG. 2 is a period 61. Referring to FIG. 4A, a center angle position 62, a start position 63 and an end position 64 of the period 61 of 60 electrical degrees are provided. In addition, referring to FIG. 4A, phase advance components 65*a* and 65*b* of the counter electromotive voltage zero cross detecting period are shown, and sections 66*a* and 66*b* which are extended until the counter electromotive voltage zero cross is generated are shown. Furthermore, start timings 67*a* and 67*b* and end timings 68*a* and 68*b* during the period of the counter electromotive voltage zero cross detection are shown in FIG. 4A.

It is necessary to form a zero current section to detect the counter electromotive voltage every phase in a sensorless drive. A predetermined period in the zero current section is set to the zero cross detecting period and the zero cross detecting period is started at the timings 67*a* or 67*b* which is advanced by the periods 65*a* or 65*b*, in FIG. 5, from the next expected counter electromotive voltage zero cross timings in view of the period which was recognized as the previous period of 60 electrical degrees. Thus, when the expected cycle is long, that is, when the expected rotation speed is low, the phase is gradually advanced and the expected value is gradually corrected. Meanwhile, when the expected cycle is short, that is, when the expected rotation speed is high, since the counter electromotive voltage zero cross is awaited in the phase as described above, the phase is delayed in result and the correct counter electromotive voltage zero cross is generated at the timings 68*a* and 68*b*, so that the expected timing is corrected.

In general, the number of start rotation pulses during the period of 60 electrical degrees in the start mode just before switched to the counter electromotive voltage feedback mode is sufficiently great, so that the rotor position just after changed into the counter electromotive voltage feedback mode is positioned at an earlier stage of the period of 60 electrical degrees, that is, at the timing 69, for example. At this time, the current profile is as shown in FIG. 4B. When previous rotor position information is provided, a U-phase current 83a rises in a relatively steep manner, a V-phase current 84a falls in a relatively steep manner, and a W-phase current 85a rises in a relatively gentle manner. Then, the U-phase current 83a starts to fall at a relatively gentle slope. Here, the low rate of change of the U-phase current 83a or the W-phase current 85a provides a gently sloped current which is effective in reducing motor vibration and noise. Before long, the U-phase current 83a becomes zero and just after a short-time of the zero current section in which the U-phase current 83a is stabilized at zero, the zero cross detecting period for detecting the zero cross when the counter electromotive voltage of the U phase is changed from positive to negative is started. Then, when the zero cross is detected at the timing 62, the U-phase current starts to fall at the relatively gentle slope in the negative direction. As described above, the counter electromotive voltage zero cross which is generated just after the mode is changed to the counter electromotive voltage feedback mode can be detected by detecting the counter electromotive voltage zero cross which is generated in the center timing 62 during the period of 60 electrical degrees, so that the zero cross detecting period may be set at the position near the timing 62 after the period of about 30 electrical degrees. In this case, the zero cross detecting period is continued until the zero cross is detected and the zero cross timing can be correctly detected.

Meanwhile, the current profile is as shown in FIG. 4C when the number of start rotation pulses during the period of 60 electrical degrees in the start mode just before the mode is switched to the counter electromotive voltage feedback mode is small and the rotor position just after the mode is changed to the counter electromotive voltage feedback mode is positioned at a final stage during the period of 60 electrical degrees, that is, at the timing 70, for example. When previous rotor position information is provided, a U-phase current 83b rises in a relatively steep manner, a V-phase current 84b falls in a relatively steep manner, and a W-phase current 85b rises in a relatively gentle manner. Then, the U-phase current 83b starts to fall at a relatively gentle slope. Here, the low rate of change of the U-phase current 83b or the W-phase current 85b provides a gently sloped current which is effective in reducing motor vibration and noise. Before long, the U-phase current 83b becomes zero and just after a short-time of the zero current section in which the U-phase current 83b is stabilized at zero, the zero cross detecting period for detecting the zero cross when the counter electromotive voltage of the U phase is changed from positive to negative is started. In this case, since the counter electromotive voltage zero cross has been already generated at the timing 62, although it seems that the zero cross should be detected at the middle timing during the next period of 60 electrical degrees, when the number of start rotation pulses during the shift of 60 electrical degrees in the start mode is sufficiently great, the zero cross detecting period is continued for a period corresponding to a period of 90 electrical degrees, so that the torque is lowered. Therefore, even when the rotor position just after the mode is switched to the counter electromotive voltage feedback mode is at the timing 70, it is preferable that the counter electromotive voltage zero cross is detected during this period of 60 electrical degrees. In this case, since the counter electromotive voltage zero cross has been already generated at the timing and the polarity is not changed until the period corresponding to the period of 180 electrical degrees, it is found that the counter electromotive voltage zero cross has been already generated at the timing 62 from its polarity and then the zero cross is immediately determined at the counter electromotive voltage zero cross detection start timing 67b and then forms the next profile of 60 electrical degrees. In addition, in this case, the torque is not lowered. As described above, since the expected cycle information can be shortened by the period 65b, the correct zero cross timing can be detected before long.

Figure 12A:
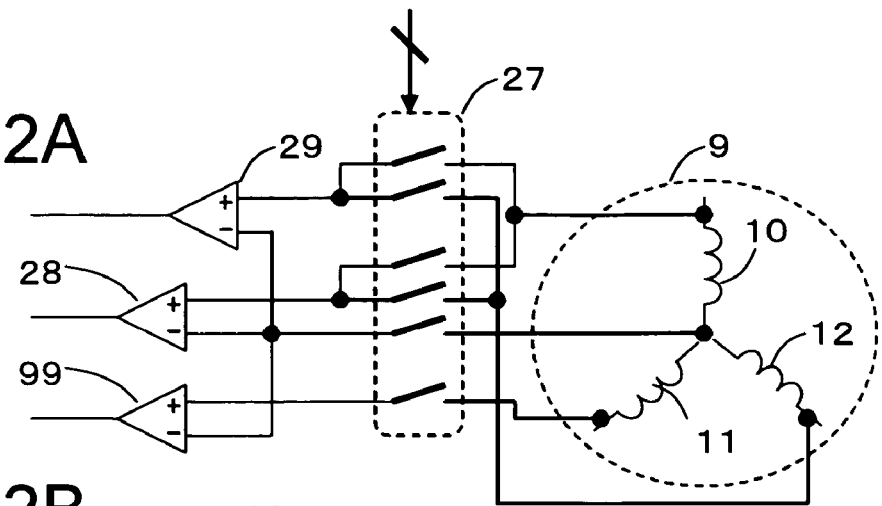
FIGS. 12A, 12B and 12C are views showing concrete constitutions of a phase comparison control block.

A description will be made of the phase comparison control block 17 hereinafter. The phase comparison control block 17 includes circuit constitutions in FIGS. 12A, 12B, and 12C. When the rotor position search pulse for the regions 71 to 78 in FIG. 7 can be applied, the rotor position search pulse for the regions 79 to 82 may not be provided. Therefore, since the V-phase terminal in which the search pulse current is always flowing is not used as the response signal detection terminal, the U-phase terminal and the W-phase terminal are connected to the comparators 28 and 29 through the terminal line selection block 27, to determine the rotor position, as shown in FIG. 12A. In addition, in the counter electromotive voltage feedback mode, the threshold values of the comparators 28 and 29 are set to zero or the absolute values thereof are set to be small and while the comparators 28 and 29 are connected to the U-phase terminal and the W-phase terminal, a comparator 99 which is used only in the counter electromotive voltage feedback mode is connected to the V-phase terminal. The outputs of the above three comparators are transmitted to the commutation control block 26.

Figure 12B:
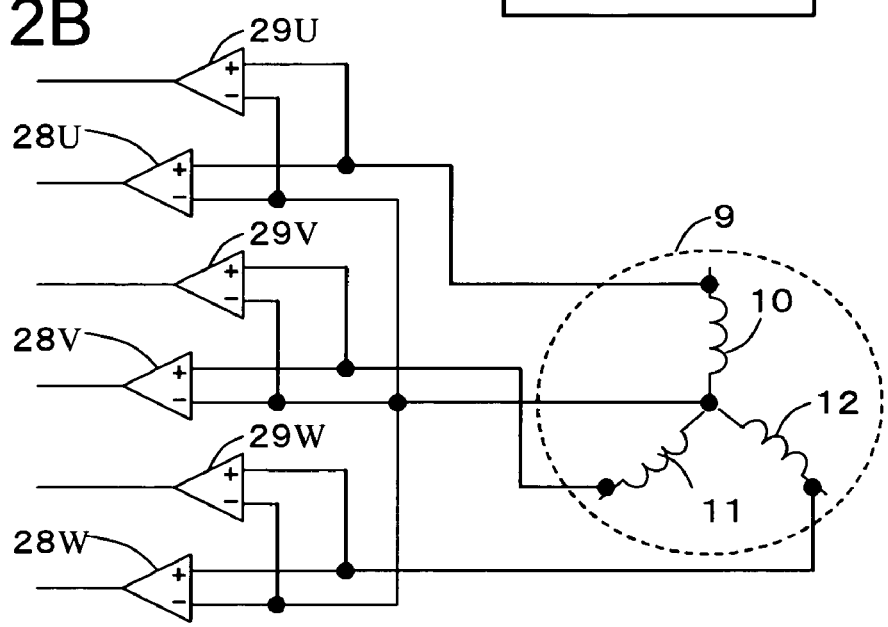

According to FIG. 12B, the terminal line selection block 27 is not used and each phase has specific two comparators to which response signals with respect to the rotor position search pulse application are inputted, that is, comparators 28U, 28V, 28W, 29U, 29V and 29W are provided. In the counter electromotive voltage feedback mode, the absolute values of the threshold values of the comparators are reduced or cleared and used as comparators for comparing the counter electromotive voltage.

Figure 12C:
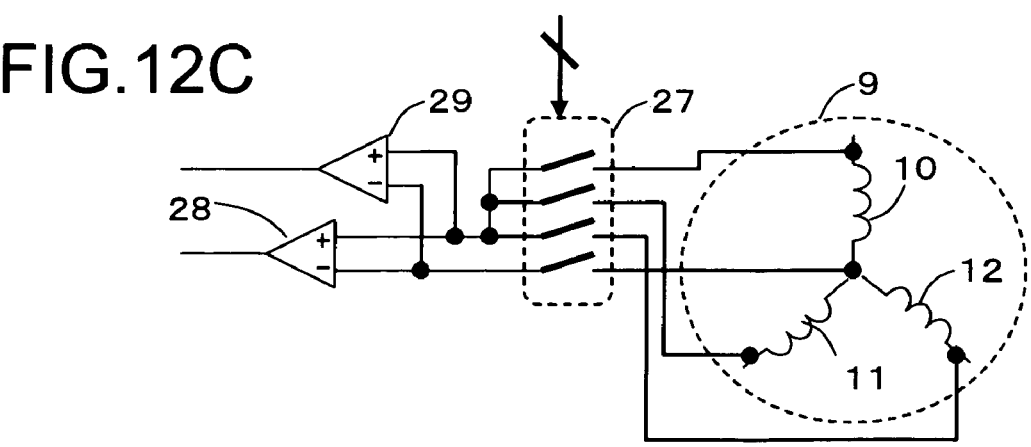

Furthermore, according to FIG. 12C, only a couple of comparators 28 and 29 read response signal with respect to a rotor position search pulse from a winding terminal to which the search pulse is not applied through the terminal line selection block 27. In the counter electromotive voltage feedback mode, the absolute values of the threshold values of the comparators are reduced or cleared and they are used as comparators for comparing the counter electromotive voltage. At this time, a counter electromotive voltage zero cross is detected from a predetermined winding terminal through the terminal line selection block 27 at its generation expected timing.

Second Embodiment

Figure 5:
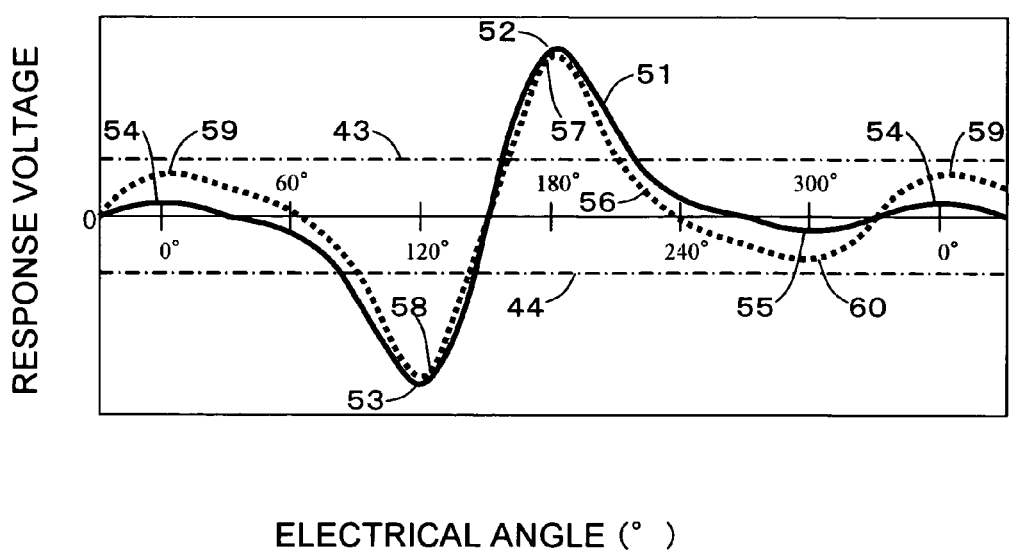
FIG. 5 is a view showing characteristics of the response voltage depending on the rotor position when a level of the rotor position search pulse is different.

A motor driving method according to a second embodiment of the present invention is characterized in that it uses a response signal value provided by an inductive action when a current of a rotor position search pulse has a predetermined value. FIG. 5 is a view showing characteristics of a response signal generated between a W-phase terminal line 15 having a current of zero and a neutral point terminal line 16 with respect to the rotor position when a rotor position search pulse is applied from a U-phase winding terminal to a V-phase winding terminal in two cases having different current levels of the rotor position search pulse. Referring to FIG. 5, a curved line 51 designates the characteristics of the response signal when the rotor position search pulse current is high and the response signal characteristics 51 includes a main peak 52, a main bottom 53, a sub peak 54 and a sub bottom 55. In addition, a curved line 56 designates the characteristics of the response signal when the rotor position search pulse current is relatively low and the response signal characteristics 56 includes a main peak 57, a main bottom 58, a sub peak 59 and a sub bottom 60. From this result, since the sub peak 54 and the sub bottom 55 in the case where the rotor position search pulse is set high are smaller than the sub peak 59 and the sub bottom 60 in the case where the rotor position search pulse is set low, lower limit margins of absolute values of a positive threshold value 43 and a negative threshold value 44 can be sufficiently provided. Therefore, when a predetermined rotor position search pulse current value is controlled well in the above rotor position detection, the sub peak and sub bottom of the response voltage signal configuration generated on both ends of the winding having a current of zero are reduced in size, so that the rotor position can be more correctly determined. That is, according to a method of applying the rotor position search pulse in general, although a predetermined voltage is applied between the winding terminals for a predetermined time when the selected high-potential drive transistor and low-potential drive transistor are turned on, it is as follows in this embodiment based on the result in FIG. 5.

Figure 6A:
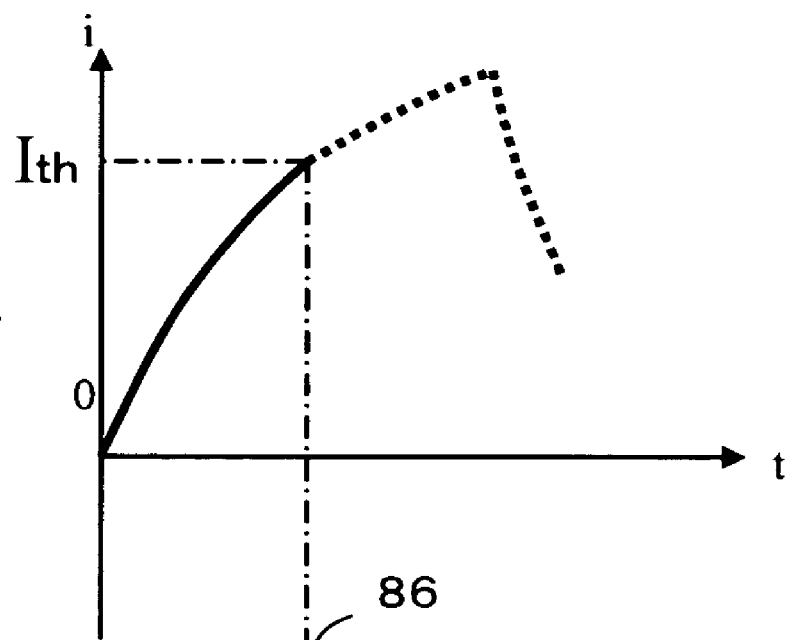
FIGS. 6A, 6B, 6C show a rotor position search current, an output signal of a comparator and a signal stored in a commutation control block, respectively, to explain control of comparison timing by a current threshold value of the rotor position search pulse according to second embodiment of the present invention.
Figure 6B:
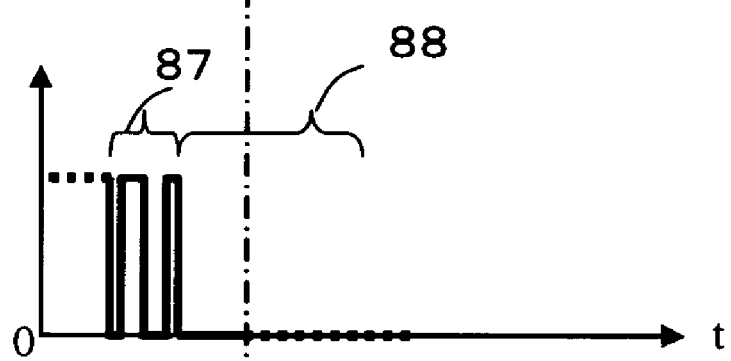
Figure 6C:

The rotor position search pulse command generator 31 in FIG. 1 sets the threshold value current value of the rotor position search pulse to determine the timing for reading out the response signal. The commutation control block 26 in the start mode turns PWM on the drive transistor selected for rotor position search pulse application with a pulse from the PWM on pulse generation block 24. This will be described with reference to FIGS. 6A to 6C. FIGS. 6A, 6B and 6C show a rotor position search current, an output signal of the comparator 29 and a signal stored in the commutation control block, respectively. The rotor position search pulse current which starts to flow on application is monitored by a current detection resistor 18 as shown in FIG. 6A, and this passes through the amplifier 19 and it is compared with a value set in the rotor position search pulse command generator 31 in the torque comparison block 23. When the rotor position search pulse current value reaches a predetermined value Ith, the outputs of the comparators 28 and 29 are inputted to the commutation control block 26 at this timing 86 and the rotor position search pulse current is turned PWM off. When it is assumed that the rotor position is at 0 degree, it is considered that as the rotor position search pulse current is increased as shown in FIG. 6B, the output of the comparator 28 erroneously detects the sub peak 59 shown in FIG. 5, and chattering is generated. The chattering could be generated depending on the current level during a period 87, and the output is stable during a period 88. Thus, when the commutation control block 26 stores the output of the comparator at the timing 86 during the period 88 in which the output is stable, the rotor position can be prevented from being erroneously detected.

Third Embodiment

A motor driving method according to a third embodiment of the present invention is characterized in that a predetermined order is set when a current is applied from a certain phase winding to another phase winding, that is, when a certain combination of the two phases is selected with priority at the time of applying a rotor position search pulse. The phase windings to which the current is to be applied are determined by selecting the high-potential drive transistor and the low-potential drive transistor when the rotor position search pulse is applied. FIG. 7 shows electrical angular positions which can determine the rotor position when series windings of the two phases are selected from three phase windings and the rotor position search pulse is applied thereto.

(i) The rotor positions which can be detected by applying the rotor position search pulse current from a U-phase winding to V-phase winding are indicated in regions 71 and 72.
(ii) The rotor positions which can be detected by applying the rotor position search pulse current from a V-phase winding to U-phase winding are indicated in regions 73 and 74.
(iii) The rotor positions which can be detected by applying the rotor position search pulse current from a V-phase winding to W-phase winding are indicated in regions 75 and 76.
(iv) The rotor positions which can be detected by applying the rotor position search pulse current from a W-phase winding to V-phase winding are indicated in regions 77 and 78.
(v) The rotor positions which can be detected by applying the rotor position search pulse current from a W-phase winding to U-phase winding are indicated in regions 79 and 80.
(vi) The rotor positions which can be detected by applying the rotor position search pulse current from a U-phase winding to W-phase winding are indicated in regions 81 and 82.

As can be seen from FIG. 7, it is not necessary to apply the search pulses in all of the above patterns. Since four detectable rotor positions are not overlapped with each other in the regions 71 to 74, the regions 75 to 78, or the regions 79 to 82, they are efficiently selected. Therefore, it is preferable that one is selected from the above three kinds of combinations and used for the first search pulse application and when the rotor position cannot be determined by the first search pulse, it is used for the second search pulse application in the first round of searching the rotor position. When the rotor position cannot be determined by the second search pulse, another search pulse is used for the third search pulse application and when the rotor position cannot be determined by the third search pulse application, it is used for the fourth search pulse application. However, as described above, in and after the second round of the step of searching the rotor position, as the first search pulse, the same search pulse by which the rotor position could be determined finally in the first round of the rotor position search is used and when the rotor position cannot be determined by the first search pulse, as the second search pulse, the search pulse which can determine the rotor position when the rotor is rotated 60 electrical degrees is used.

Referring to FIG. 7, the regions 71 and 72 in which the rotor position can be detected by applying the rotor position search pulse current from the U-phase winding to V-phase winding, the regions 75 and 76 in which the rotor position can be detected by applying the rotor position search pulse current from the V-phase winding to W-phase winding, the regions 79 and 80 in which the rotor position can be detected by applying the rotor position search pulse current from the W-phase winding to U-phase winding, are hardly overlapped with each other. Therefore, even when two kinds of search pulse currents of those are applied two times, about the same rotor position detection probability can be provided as in the case where the rotor position search pulse current is applied between one pair of terminals in the forward and reverse directions as described above. Then, as the third search pulse current application for detecting the rotor position, the current pulse is applied between the phases of the one of the above two kinds in the reverse direction and as the fourth current application, the current pulse is applied between the phases of the other of the above two kinds in the reverse direction, so that the entire rotor position can be covered. Namely, as shown in the flowchart in FIG. 15, for example, when the rotor position search pulse current is applied from the U-phase winding to the V-phase winding, and then from the V-phase winding to the W-phase winding, and then from the V-phase winding to U-phase winding and finally from W-phase winding to V-phase winding, the rotor position can be detected in early stage. In addition, even when this order is partially changed such that the rotor position search pulse current is applied from the U-phase winding to the V-phase winding, and then from the V-phase winding to the W-phase winding, and then from the W-phase winding to V-phase winding and finally from V-phase winding to U-phase winding, the rotor position can be detected. In this case, the V phase is a source in the first rotor position search pulse current application and it is a sink in the second rotor position search pulse current application. When the V phase is the source also in the second search pulse current application, the regions of the electrical angle in which the rotor position can be detected in the first and second current applications are regions 71, 72, 77 and 78 in FIG. 7, so that they are overlapped and the rotor position is not likely to be detected in early stage.

Similarly, the regions 73 and 74 in which the rotor position can be detected by applying the rotor position search pulse current from the V-phase winding to U-phase winding, the regions 77 and 78 in which the rotor position can be detected by applying the rotor position search pulse current from the W-phase winding to V-phase winding, the regions 81 and 82 in which the rotor position can be detected by applying the rotor position search pulse current from the W-phase winding to U-phase winding, are hardly overlapped with each other. Therefore, even when two kinds of search pulse currents of those are applied two times, about the same rotor position detection probability can be provided as in the case where the rotor position search pulse current is applied between one pair of terminals in the forward and reverse directions as described above. Then, as the third search pulse current application for detecting the rotor position, the current pulse is applied between the phases of the one of the above two kinds in the reverse direction and as the fourth search pulse current application, the current pulse is applied between the phases of the other of the above two kinds in the reverse direction, so that the entire rotor position can be covered.

Fourth Embodiment

Figure 8A:
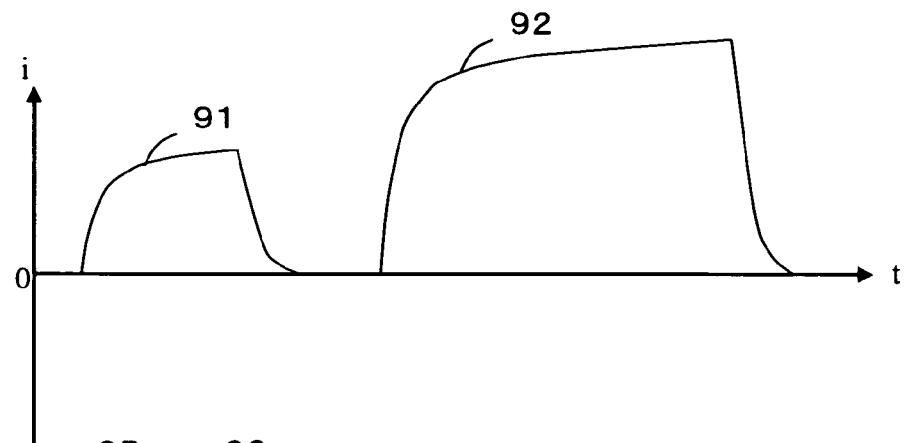
FIG. 8A is an example of the rotor position search pulse and start rotation pulse according to the first to third embodiments.
Figure 8B:
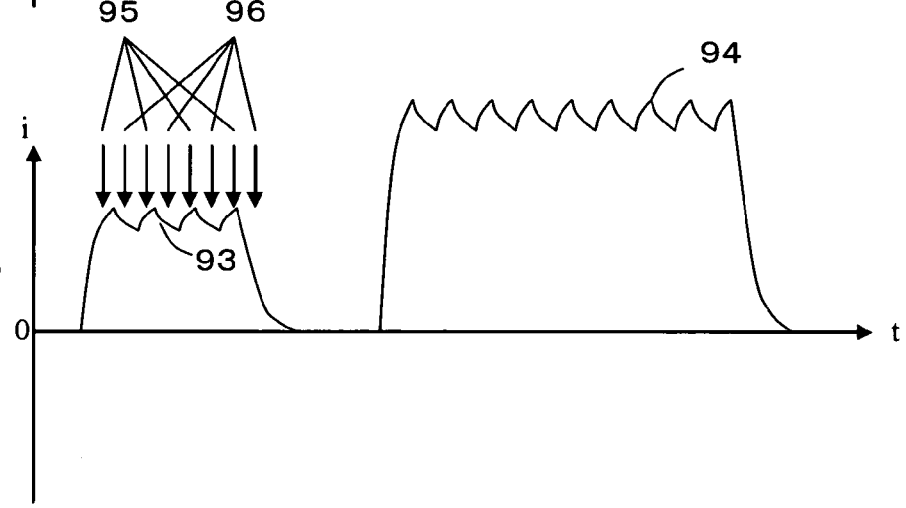
FIG. 8B is an example of a rotor position search pulse and a start rotation pulse according to an embodiment 4.
Figure 9:
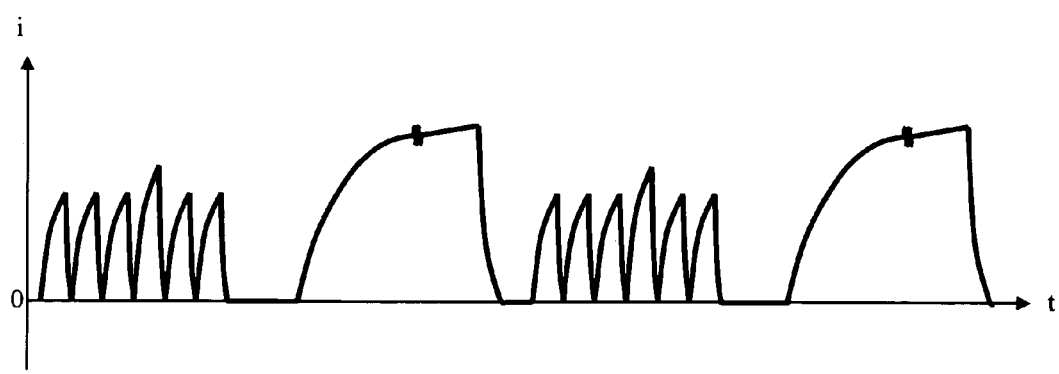
FIG. 9 is a schematic view showing a pulse current in a conventional example.

A motor driving method according to a fourth embodiment of the present invention is characterized in an applying method of a start rotation pulse. A start rotation pulse is applied between a phase to be energized based on the result of the rotor position determination. A method of applying the start rotation pulse will be described with reference to FIGS. 8A and 8B. According to the above description, the rotor position search pulse and the start rotation pulse include a pulse 91 and a pulse 92, respectively as shown in FIG. 8A. However, a period in which the start rotation pulse especially is applied is elongated and an excessive current rise is caused in some cases, which becomes a problem in reliability. Thus, according to the motor driving method in this embodiment, it is characterized in that a pulse 94 shown in FIG. 8B is PWM driven. According to the PWM pulse, when it reaches a current peak value based on the torque command value from the start pulse command generator 32, it is turned PWM off and then turned PWM on after a predetermined time, so that its current level can be kept constant and reliability is maintained. The rotor position search pulse may be also PWM controlled in a current value as shown by a pulse 93 in FIG. 8B, so that the rotor position can be prevented from being erroneously detected.

Figure 13:
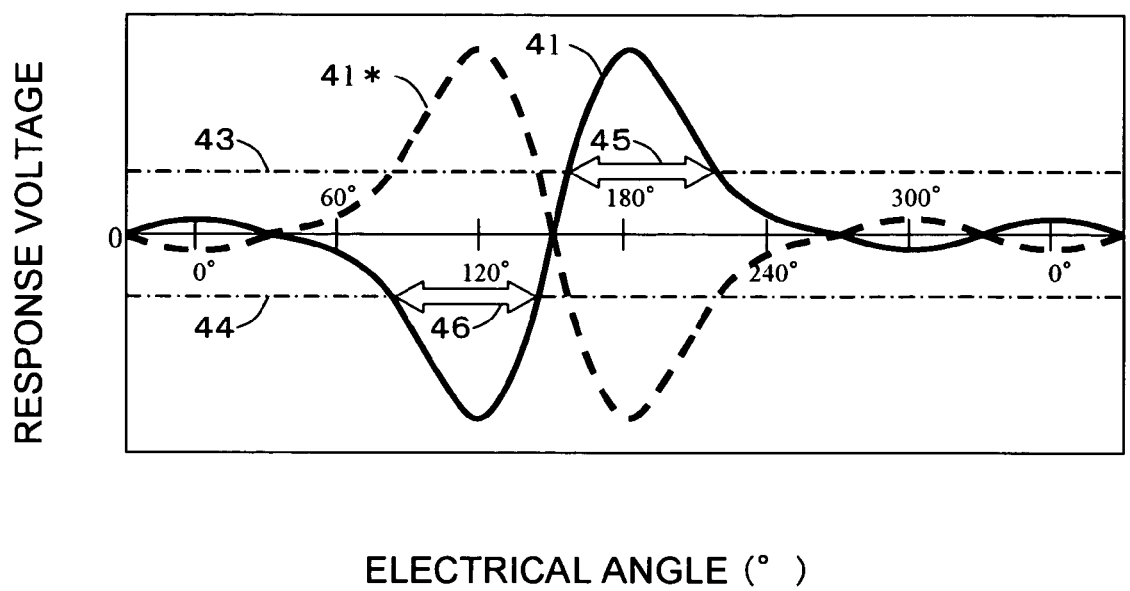
FIG. 13 is a view showing characteristics of the response voltage depending on the rotor position when a polarity of the rotor position search pulse current is different.

In addition, although the description has been made based on the response signal when the search pulse current is on the increase, a description will be made of a fact that the rotor position can be detected when the search pulse current is on the decrease also. FIG. 13 is a view showing characteristics of the response signal of the search pulse with respect to the electrical degrees of the rotor position like FIG. 2. The horizontal axis designates the electrical angle of the rotor position and the vertical axis designates the response signal in FIG. 13. Similar to FIG. 2, FIG. 13 shows the case where a rotor position search pulse current is applied from a U-phase winding to a V-phase winding, in which reference numeral 41 designates the response signal which appears in a W-phase winding to which a current is not applied when the pulse current is on the increase and reference numeral 41* designates the response signal which appears in the W-phase winding to which a current is not applied when the pulse current is on the decrease. Since the response signal is detected as a product of an inductance and a current variation, the response signals 41 and 41* which appear when the rotor is in the same position have opposite polarity. That is, when threshold values of the response signals 41 and 41* are set, one is set to a positive value and the other is set to a negative value. For example, according to the pulse 93 shown in FIG. 8B, the response signal having the opposite polarity can be detected during a period from PWM off to PWM on. That is, when it is assumed that the rotor position search pulse is applied from the V-phase terminal to the W-phase terminal while the rotor position is at 240 degrees in FIG. 8B, as the response signal of the U-phase winding 10, although it has been described that the output of the comparator 29 is the L level signal during a period 95, since the output of the comparator 28 is the H level signal during a period 96, this may be used.

Fifth Embodiment

A motor driving method according to a fifth embodiment of the present invention is characterized in setting a threshold value to be compared with a response signal in searching a rotor position. Since an appropriate threshold value level range to be compared with the response signal is varied depending on the motor, it is necessary to set the threshold value to the appropriate value depending on the motor. When the threshold value is too high, an angular range of each of the regions 45 to 48 of the rotor position which can be detected shown in FIG. 2, for example is narrowed, so that undetectable range (determination dead point) of the rotor position is generated. Meanwhile, when the threshold value is too low, a sub peak or a sub bottom could be erroneously determined as a main peak or a main bottom. Thus, according to the motor driving method in the fifth embodiment, an absolute value of the initial threshold value is set high. Even when the six kinds of rotor position search pulses shown in FIG. 14 are applied, in a case where the outputs of comparators 28 and 29 are neither the H level signal nor L level signal, that is, in a case where the rotor position cannot be determined, the threshold value is to be self-adjusted. For example, after the absolute value of the threshold value is adjusted, the rotor position is searched again. Thus, when the dead point is recognized, it can be removed. The self-adjusted threshold value level is updated. When a nonvolatile memory is incorporated inside, the modulated threshold value is stored inside, so that the rotor position can be immediately searched for the future. The step of updating the threshold value level can be put in a path 97 shown in FIG. 14 and a path 98 shown in FIG. 15.

Figure 17:
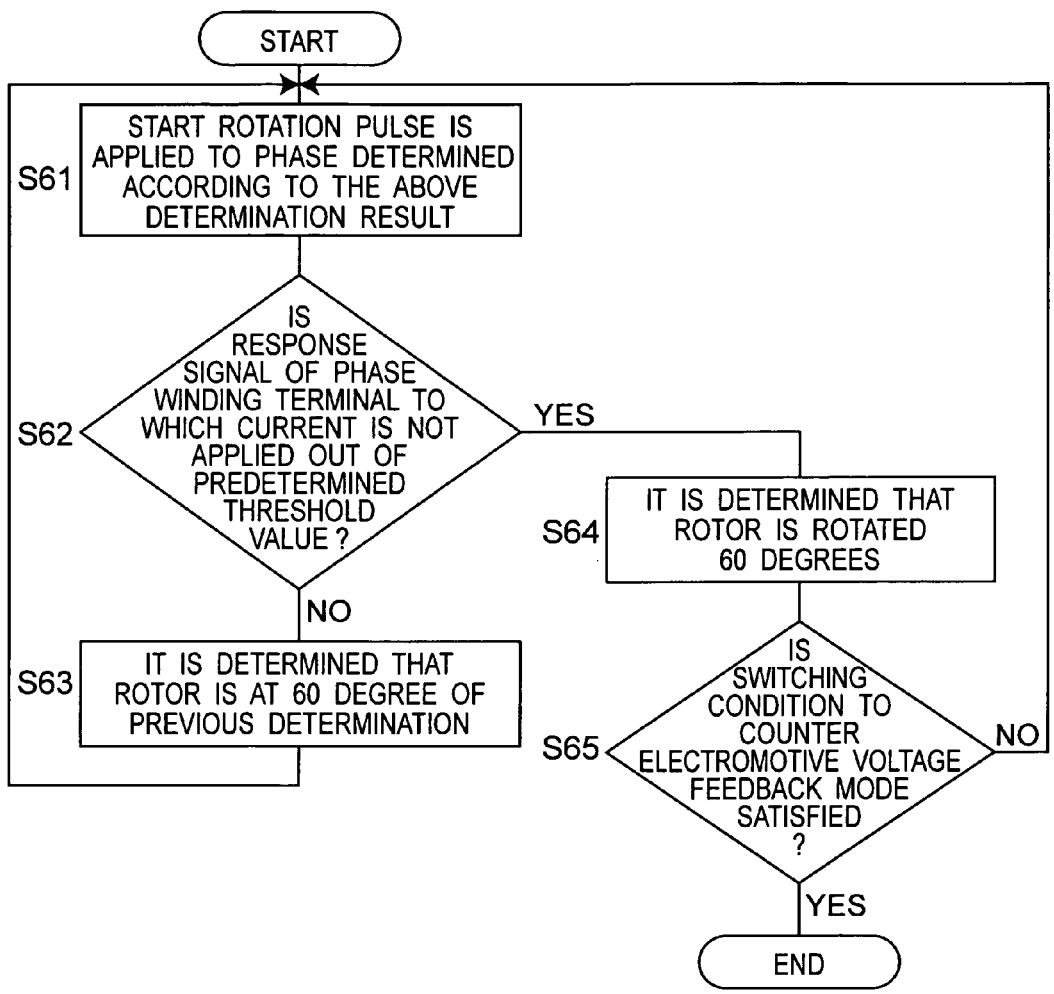
FIG. 17 is a flow chart showing steps after the first start rotation torque applying step in a start mode according to eighth and ninth embodiments.
Figure 18:
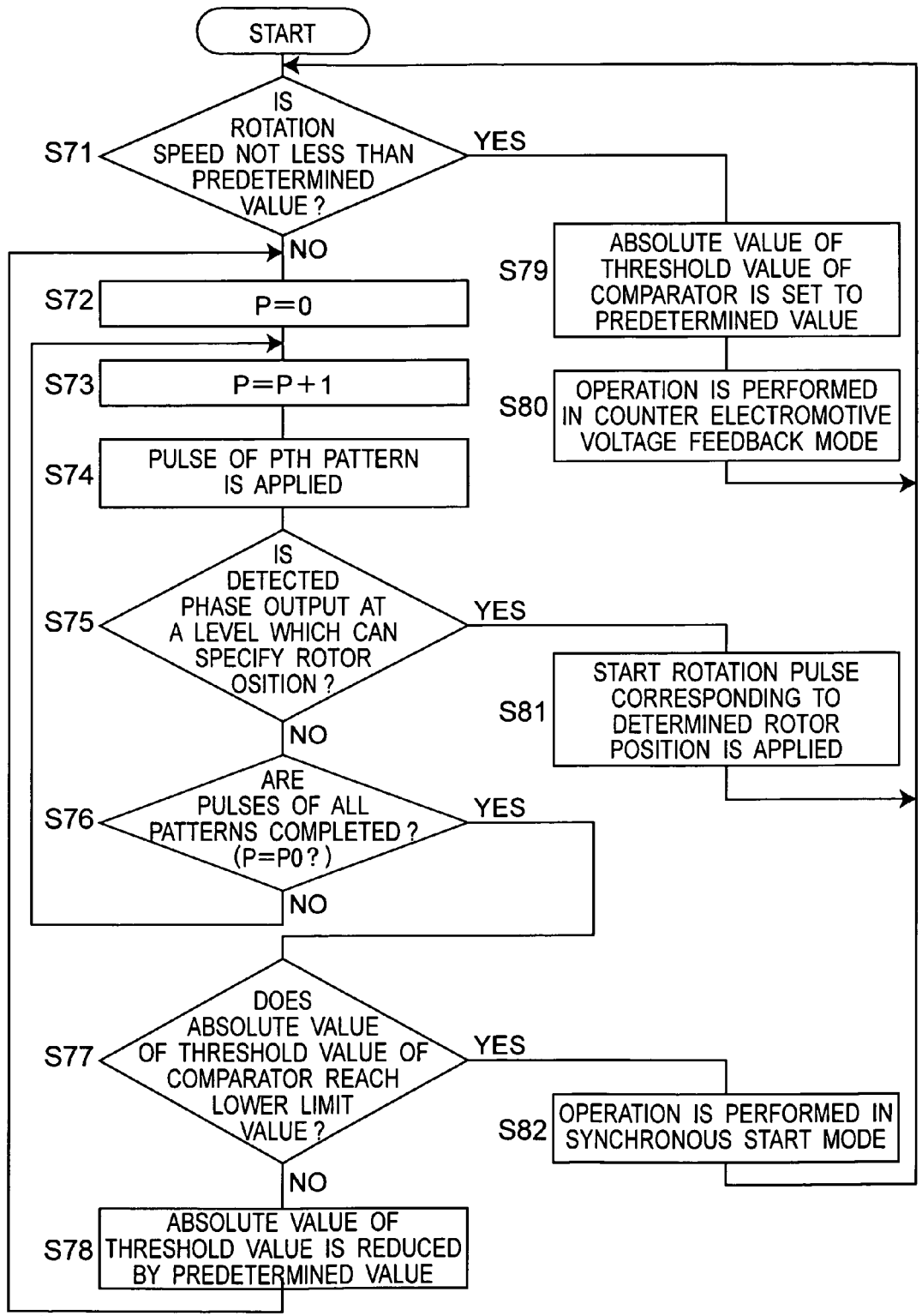
FIG. 18 is a flowchart of a motor driving method in fifth embodiment of the present invention including self-adjustment of a threshold value.

FIG. 18 is a flowchart showing the motor driving method containing self-adjustment of the threshold value. According to FIG. 18, the rotor position searching step shown in FIGS. 14 to 17 are generalized and a step of reducing an absolute value level of the threshold value with respect to the response signal to the rotor position search pulse is added. Furthermore, in a case where rotor position detection precision is not improved by varying the threshold value, a step of shifting to a synchronous start mode in which the operation is synchronously started, and a step of switching the mode to the counter electromotive voltage feedback mode based on the rotor position information provided by detecting the counter electromotive voltage provided by motor rotation are added.

(a) It is determined whether a rotation speed is not less than a predetermined value at step S71. When the rotation speed is less than the predetermined value, it is determined that the rotation speed is zero or very low and the mode is determined as the start mode and the operation proceeds to the next step S72. Meanwhile, when the rotation speed is not less than the predetermined value, it is determined that the mode is the counter electromotive voltage feedback mode and the operation proceeds to step S79. In addition, although the term "counter electromotive voltage feedback mode switching condition" is used in FIGS. 16 and 17, a more concrete rotation speed is used as the switching condition here.

(b) Then, the pattern number P of the rotor position search pulses to be applied is initialized. More specifically, 0 is assigned to P (P=0) at step S72.

(c) Then, the pattern number P of the rotor position search pulses to be applied is incremented. More specifically, a value 1 is added to the P and the obtained value is assigned to the P (P=P+1) at step S73.

(d) The Pth pattern of the search pulse is applied at step S74.

(e) It is determined whether the detected phase output is at a level which can specify the rotor position or not at step S75. When the output is the H level signal or the L level signal, the rotor position can be determined and a start rotation pulse corresponding to the determined rotor position is applied at step S81. The rotor position search pulse applying step and the start pulse applying step are repeated until the rotation speed reaches a predetermined value (start mode). Then, the operation returns to step 71.

(f) It is determined whether pulses of all patterns are applied or not (P=Po?) at step S76. Here, Po is the number of all patterns. Po is 6 in the case shown in FIG. 14 and Po is 4 in the case shown in FIG. 15.

(g) It is determined whether the absolute value of the threshold value of the comparator reaches the lower limit value or not at step S77. When the absolute value of the threshold value reaches the lower limit value, since the absolute value of the threshold value cannot be reduced any more, a rotating magnetic field having a predetermined rotation speed is generated in a stator and the motor is started in the synchronous start mode at step S82. Although the start speed is slow in this synchronous start mode, the motor can be surely started even when the rotor position is not certain. Then, the operation returns to the step S71. Meanwhile, when it does not reach the lower limit value, the operation moves to step S78.

(h) The absolute value of the threshold value is reduced by a predetermined value at step S78. When the rotor position cannot be determined after a series of pattern application even though the absolute value of the threshold value of the comparator is reduced by the predetermined value, the absolute value of the threshold value of the comparator is reduced by the predetermined value again. When the rotor position cannot be determined, this step of reducing the absolute value of the threshold value of the comparator is repeated until it is determined in step 77 that the absolute value of the threshold value of the comparator reaches the lower limit value. Then, the operation returns to the step S71.

(i) When it is determined that the rotation speed reaches the predetermined value at the step S71, the absolute value of the threshold value of the comparator is set to a predetermined value suitable for the counter electromotive voltage feedback mode at step S79. Then, the operation is performed in the counter electromotive voltage feedback mode at step S80. Then, the operation returns to the step S71.

As described above, the motor can be driven while the threshold value is self-adjusted and the dead point for determining the rotor position is eliminated.

Sixth Embodiment

A motor driving method according to a sixth embodiment of the present invention is characterized in that a rotor is displaced by applying a kick pulse when the rotor position cannot be determined by the predetermined rotor position determination. Since the dead point in the rotor position determination is rare in the entire electrical angle, according to this motor driving method, when the rotor position cannot be determined by the predetermined rotor position determination, the rotor is slightly displaced from the present position by the predetermined kick pulse applied. Thus, since the rotor is shifted from the dead point, the rotor position can be determined. The kick pulse includes a plurality of pulses including at least one pulse to which torque having a predetermined value or more is applied. For example, in a case where two kinds of pulses which are out of phase by 90 degrees with each other are applied, when it is assumed that maximum torque is 1, at least 0.71 of torque can be applied. As another case, in a case where three kinds of pulses which are out of phase by 60 or 120 degrees with each other are applied, when it is assumed that the maximum torque is 1, at least 0.87 of torque can be applied. Furthermore, as another case, in a case where two kinds of pulses which are out of phase by 60 or 120 degrees with each other are applied, when it is assumed that the maximum torque is 1, at least 0.50 of torque can be applied. In the above cases, the combination of the pulses which are out of phase by 60 or 120 degrees with each other can be implemented by applying a current pulse to any two terminals selected from the three phase winding terminals shown in FIG. 1. In addition, the pulses which are out of phase by 90 degrees with each other can be implemented by applying the current pulse to any two terminals selected from the three phase winding terminals first and applying the current pulse between the two terminals bundled together and a remaining terminal secondly. This kick pulse applying step may be put in the path 97 shown in FIG. 14 or the path 98 shown in FIG. 15.

Seventh Embodiment

A motor driving method according to a seventh embodiment of the present invention is characterized in that a start mode is shifted to a counter electromotive voltage feedback mode by estimating a rotation speed. A description has been made of the case where the rotor is sequentially rotated by 60 electrical degrees in the start mode in general in the above embodiments. This is implemented when a motor load is normal and a modified start rotation torque is applied thereto. In addition to the case of the normal load, in order to adapt a case where a load is light, the rotor rotation speed is to be increased in the same start rotation pulse, so that the rotor is rotated 120 degrees or 180 degrees in a breath and the condition to confirm the rotor rotation of 60 electrical degrees cannot be satisfied, which could cause non-smooth acceleration. In this case, the cycle of the rotor rotation for 60 electrical degrees is measured and when it is detected that an expected rotation speed has a predetermined value or more, then, it is found that the rotor rotation speed is high. In this case, all phases are turned off for a predetermined period and a zero cross interval of at least one phase or zero cross intervals of the plurality of phases are measured, so that the rotation speed can be correctly estimated. Based on the estimated rotation speed, a torque command profile and a counter electromotive voltage detecting period are set and then the counter electromotive voltage feedback mode is implemented. Thus, the motor can be started and accelerated stably not only in the case the load is normal but also in the case the load is light.

In addition, when the load is light similarly, in a case where smooth acceleration is not provided in the start mode, since a rotation torque is generated in a search pulse in some cases, the start rotation torque can be prevented from being generated in the search pulse by reducing its current value and its continuing time or its width. In addition, it is effective that the current value and the continuing time or the width of the start rotation pulse is reduced to prevent the rotor from being rotated 120 degrees or 180 degrees so that the rotor rotation confirming condition of 60 electrical degrees can be satisfied. These can be implemented by controlling the current value of the start rotation pulse as described in the fourth embodiment.

Eighth Embodiment

A motor driving method according to an eighth embodiment of the present invention is characterized in that a step of applying a start rotation pulse is combined with a step of applying a rotor position search pulse. FIGS. 10A to 10E show an example of a schematic timing chart in which the step of applying the rotor position search pulse in FIGS. 3A to 3E is rationalized. In FIGS. 10A to 10E, the horizontal axis designates a time, and FIGS. 10A, 10B and 10C designate a U-phase winding current, a V-phase winding current and a W-phase winding current in the vertical axes, respectively, and FIG. 10D designates an output result of a comparator 28 or a comparator 29, and FIG. 10E designates a determined result of a rotor position. According to the motor driving method in the eighth embodiment, a first step SD1 of applying the start rotation pulse, in which the start rotation pulse current is applied from the V-phase terminal to the U-phase terminal is combined with a second step of applying the rotor position search pulse. Since the response signal from the W phase is small at the start rotation pulse applying steps SD1 to SD3, although it is considered that the rotor position is at a position corresponding to 60 electrical degrees, a position corresponding to 120 electrical degrees, a position corresponding to 180 electrical degrees, or a position corresponding to 240 electrical degrees, it is determined that the rotor is not rotated and still positioned at 240 electrical degrees. According to this rotor position determining method, although detectable electrical angle is not precisely provided, it can be correctly performed according to the condition that the rotor is rotated every predetermined electrical degrees by the start rotation pulse applied one time.

The response signal from the W phase becomes a positive threshold value or more at a fourth start rotation pulse applying step SD4, and it is determined that the rotor is rotated 60 electrical degrees to be at a position of 300 degrees and a current is applied from the W-phase terminal to a U-phase terminal at a fifth start rotation pulse applying step SD5. Although it is considered that the rotor position is at a position corresponding to 120 electrical degrees, a position corresponding to 180 electrical degrees, a position corresponding to 240 electrical degrees, or a position corresponding to 300 electrical degrees at the steps SD5 and SD6, it is determined that the rotor is not rotated and still positioned at 300 electrical degrees, similar to the determination at the start rotation pulse applying steps SD1 to SD3.

The response signal from the V phase becomes the negative threshold value or less at a seventh start rotation pulse applying step SD7 and it is determined that the rotor is rotated 60 electrical degrees to be at 0 electrical degree. Then, a current is applied from the W-phase terminal to the V-phase terminal at an eighth start rotation pulse applying step SD8. FIGS. 10A to 10E show that when the third rotation of 60 electrical degrees is confirmed at a start rotation pulse applying step SD9 finally and the mode is switched to the counter electromotive voltage feedback mode.

FIG. 17 is a flowchart showing this motor driving method.

(a) First, the start rotation pulse is applied between the phase based on the determination result of the rotor position at the previous rotor position searching step at step S61. In addition, since the start rotation pulse applying step is combined with the rotor position search pulse applying step, the search pulse applying step in FIG. 16 is omitted.

(b) It is determined whether the response signal of the winding terminal of the phase to which the start rotation pulse current is not applied is out of the threshold value (that is, state 0 which is neither H level signal nor L level signal) or not at step S62. When the response signal is the same as previous one (NO: state P or state N), it is determined that the rotor is positioned during the same period of 60 electrical degrees as before at step S63. Then, the operation returns to the step S61.

(c) Meanwhile, when it is determined that the response signal is state 0 (YES) at the step S62, it is determined that the rotor is rotated to the next period of 60 electrical degrees at step S64 and it is determined whether the counter electromotive voltage feedback mode switching condition is satisfied or not at step S65. When the counter electromotive voltage feedback mode switching condition is satisfied, the process is completed. Then, the operation is performed in the well-known counter electromotive voltage feedback mode. Meanwhile, when the switching condition is not satisfied, the operation returns to the step S61.

According to the motor driving method in the eighth embodiment, since the start rotation pulse is used instead of the rotor position search pulse which does not contribute to the torque, acceleration at the time of start can be improved.

Ninth Embodiment

A motor driving method according to a ninth embodiment of the present invention is characterized in that a PWM drive pulse whose peak current value is controlled is applied at a start rotation pulse applying step. FIGS. 11A to 11E shows an example of a timing chart showing the start rotation pulse applying step in the motor driving method according to the ninth embodiment. FIGS. 11A to 11E show the example in which the step of applying the rotor position search pulse in FIGS. 3A to 3E are rationalized like in FIGS. 10A to 10E. In FIGS. 11A to 11E, the horizontal axis designates a time, and FIGS. 11A, 11B and 11C designate a U-phase winding current, a V-phase winding current and a W-phase winding current in the vertical axes, respectively, and FIG. 11D designates an output result of a comparator 28 or a comparator 29, and FIG. 11 E designates a determined result of a rotor position. Although the start rotation pulses at the start rotation pulse applying steps SD1 to SD4 are separated in FIG. 10, FIG. 11 shows a PWM drive period in which the peak current value is controlled by current waveforms at start rotation pulse applying steps SD11 to SD13. According to the ninth embodiment, an arrow of a solid line in FIG. 11D designates an increase section of the absolute value of the pulse current. When the response signal generated in the increase section at the start rotation pulse applying step SD11 is the positive threshold value or more, it means that the rotor is positioned at 300 electrical degrees. Similarly, when the response signals generated in the increase sections at the start rotation pulse applying steps SD12 and SD13 are the negative threshold value or lower and the positive threshold value or more, it means that the rotor is positioned at 0 electrical degrees and at 60 electrical degrees, respectively. In addition, an arrow of a dotted line in FIG. 11D designates a decrease section of the absolute value of the pulse current. When the response signal generated in the decrease section at the start rotation pulse applying step SD11 is the negative threshold value or less, it means that the rotor is positioned at 300 electrical degrees. Similarly, when the response signals generated in the decrease sections at the start rotation pulse applying steps SD12 and SD13 are the positive threshold value or more and the negative threshold value or less, it means that the rotor is positioned at 0 electrical degrees and at 60 electrical degrees, respectively. In addition, either one of the response signal generated in the increase period of the pulse current or the response signal generated in the decrease period thereof may be used or both of them may be used to determine the rotor position. According to the motor driving method in the ninth embodiment of the present invention, the pulse current which applies the torque to start the rotation is sequential, so that acceleration at the time of start can be further improved as compared with the eighth embodiment shown in FIGS. 10A to 10E.

Although the description of the present invention has been made with reference to each embodiment, the present invention is not limited to the embodiments and includes another example based on the scope of the present invention, and the scope of the present invention is limited only by the terms of the appended claims.

According to the motor driving device and the motor driving method of the present invention, a stable and high-speed start rotation is attained by enabling correct rotor position determination to contribute to a high-speed start of a system. In addition, a start rotation speed is hardly affected by a load variation at the time of start. In addition, these are easily controlled at low cost and extremely useful for a sensorless motor driving device which is provided stably with high performance at low cost.

What is claimed is:

1. A rotor position sensorless multiphase motor driving device comprising:
    a rotor;
    a plurality of phase windings;
    a common terminal to which one terminal of terminals at both ends of each winding is star connected;
    an upper-side drive transistor and a lower-side drive transistor connected to the other terminal of the winding;
    a commutation control unit operable to select two terminals from the terminals other than the common terminal of the windings, and to turn on the corresponding pair of upper-side drive transistor and the lower-side drive transistor;
    a rotor position search pulse applying unit operable to apply a search pulse between the selected two terminals; and
    a comparing unit operable to detect a rotor position based on a response signal generated between the unselected terminal other than the common terminal and the common terminal according to the search pulse application.

2. The motor driving device according to claim 1, wherein the comparing unit compares the response signal with a predetermined threshold value to detect the rotor position.

3. The motor driving device according to claim 2, further comprising a setting unit operable to set at least one of a positive threshold value and a negative threshold value as the threshold value.

4. The motor driving device according to claim 3, further comprising a varying unit operable to vary the threshold value.

5. The motor driving device according to claim 4, further comprising a terminals line selecting unit operable to switch the input terminals of the comparing unit to the terminals of each winding.

6. The motor driving device according to claim 1, further comprising a controlling unit operable to control a peak value of a start rotation pulse current in a start mode in which a rotation speed is very low at the time of start.

7. The motor driving device according to claim 1, further comprising a controlling unit operable to control a peak value of a rotor position search pulse current in the start mode in which a rotation speed is very low at the time of start.

8. The motor driving device according to claim 1, further comprising:
    a current commanding unit operable to find that the rotor position search pulse current reaches a predetermined value in the start mode; and
    a transmitting unit operable to transmit an output of a commutation control comparator to a commutation control block at a timing when the pulse current value exceeds the current command value.

9. The motor driving device according to claim 1, wherein the comparing unit comprises:
    a first comparing unit operable to compare the response signal with a positive threshold value; and
    a second comparing unit operable to compare the response signal with a negative threshold value.

10. The motor driving device according to claim 9, wherein the comparing unit can be used in the start mode and in a counter electromotive voltage feedback mode in which a counter electromotive voltage generated by rotation of the rotor is detected and commutation can be controlled.

11. The motor driving device according to claim 1, wherein the rotor position search pulse applying unit applies a first search pulse to a selected first couple of terminals in a first polarity,
   in a case where the rotor position is not detected by the response signal in response to the first search pulse, it applies a second search pulse to a selected second couple of terminals in the first polarity,
   in a case where the rotor position is not detected by the response signal in response to the second search pulse, it applies a third search pulse to the first couple of terminals in a second polarity which is opposite to the first polarity, and
   in a case where the rotor position is not detected by the response signal in response to the third search pulse, it applies a fourth search pulse to the second couple of terminals in the second polarity which is opposite to the first polarity, or
   in a case where the rotor position is not detected by the response signal in response to the second search pulse, it applies a third search pulse to the second couple of terminals in a second polarity which is opposite to the first polarity, and
   in a case where the rotor position is not detected by the response signal in response to the third search pulse, it applies a fourth search pulse to the first couple of terminals in the second polarity which is opposite to the first polarity.

12. The motor driving device according to claim 11, wherein regarding a phase which is common among a first couple of phases selected when the rotor position search pulse applying unit applies the first rotor position search pulse and a second couple of phases selected when it applies the second rotor position search pulse,
   in a case where the terminal of the phase is a current source when the first rotor position search pulse is applied, the terminal of the phase is a current sink when the second rotor position search pulse is applied, and
   in a case where the terminal of the phase is the current sink when the first rotor position search pulse is applied, the terminal of the phase is the current source when the second rotor position search pulse is applied.

13. The motor driving device according to claim 12, wherein the rotor position search pulse applying unit selects a combination of predetermined phases as two terminals of one phase, among the first couple of terminals and the second couple of terminals.

14. A disk driving system comprising:
   a motor driving device according to claim 1, and
   a motor controlled by the motor driving device to drive a disk.

15. A motor driving method of a rotor position sensorless multiphase motor driving device comprising: a rotor; a plurality of phase windings; a common terminal to which one terminal of terminals at both ends of each winding is star connected; a plurality of a set of an upper-side drive transistor and a lower-side drive transistor connected to the other terminal of the winding; and a commutation control unit operable to turn on the pair of upper-side drive transistor or the lower-side drive transistor, the method comprising:
   selecting two terminals from the terminals other than the common terminal of the windings when the rotor is started and applying a search pulse between the selected two terminals to search a rotor position;
   detecting the rotor position based on a response signal generated between the terminal which was not selected and the common terminal at the search pulse applying step; and
   applying a start rotation pulse based on the detected rotor position.

16. The motor driving method according to claim 15, wherein, in a case where the rotor position is not detected in the rotor position detecting step, at least the search pulse applying step is repeated.

17. The motor driving method according to claim 15, wherein, in a case where the rotor position is not detected by the first search pulse at the rotor position detecting step, a second search pulse is applied between the two terminals selected at the time of the first search pulse application, in a polarity opposite to that of the first search pulse application at the search pulse applying step.

18. The motor driving method according to claim 17, wherein, in a case where the rotor position is not detected by the second search pulse at the rotor position detecting step,
   a couple of terminals which is different from those at the time of the first and second search pulse application is selected and a third search pulse is applied between the selected terminals at the search pulse applying step.

19. The motor driving method according to claim 18, wherein in a case where the rotor position is not detected by the third search pulse at the rotor position detecting step,
   a fourth search pulse is applied between the two terminals selected at the time of the third search pulse application in a polarity opposite to that of the third search pulse application at the search pulse applying step.

20. The motor driving method according to claim 19, wherein in a case where the rotor position is not detected by the fourth search pulse at the rotor position detecting step,
   a couple of terminals which is different from those at the time of the first to the fourth search pulse application is selected and a fifth search pulse is applied between the selected terminals at the search pulse applying step.

21. The motor driving method according to claim 20, wherein in a case where the rotor position is not detected by the fifth search pulse at the rotor position detecting step,
   a sixth search pulse is applied between the two terminals selected at the time of the fifth search pulse application in a polarity opposite to that of the fifth search pulse application at the search pulse applying step.

22. The motor driving method according to claim 15, wherein, in a case where the rotor position is detected at the rotor position detecting step,
   the start rotation pulse applying step is performed and the first round is completed, and then, the second round comprising the search pulse applying step, the rotor position detecting step and the start rotation pulse applying step to be performed.

23. The motor driving method according to claim 22, wherein, at the search pulse applying step in the Nth round (N is an integer of 2 or more), the same search pulse as the previous search pulse by which the rotor position was detected in the (N−1)th round is applied as the first search pulse to the two terminals selected when the previous search pulse by which the rotor position was detected was applied in the N−1)th round.

24. The motor driving method according to claim 23, wherein in a case where the first search pulse is applied at the search pulse applying step in the second round and the rotor position is not detected at the rotor position detecting step, a search pulse which can detect a position to which the rotor is rotated from a position which was detected at the rotor position detecting step in the first round by 60 electrical degrees is applied as the second search pulse at the search pulse applying step.

25. The motor driving method according to claim 15, wherein in a case where a predetermined condition to switch a mode from the start mode to the counter electromotive voltage feedback mode is not satisfied, when a rotation speed, which is estimated from an interval of the rotation of the rotor generated in the start mode, exceeds a predetermined value, while all phases are turned off for a predetermined time, a torque command profile estimated from an interval between counter electromotive voltage zero crosses of at least one phase and a counter electromotive voltage detecting period are provided to switch the mode to the counter electromotive voltage feedback mode.

26. The motor driving method according to claim 15, wherein in a case where a predetermined condition to switch a mode from the start mode to the counter electromotive voltage feedback mode is not satisfied, a current peak level of the search pulse is reduced.

27. The motor driving method according to claim 15, wherein in a case where a predetermined condition to switch a mode from the start mode to the counter electromotive voltage feedback mode is not satisfied, either one of a search pulse applying period or a search pulse PWM applying period is reduced.

28. The motor driving method according to claim 15, wherein the rotor position is determined by comparing the response signal in response to the search pulse with a predetermined threshold value at the rotor position detecting step.

29. The motor driving method according to claim 28, wherein the threshold value is set at the rotor position detecting step.

30. The motor driving method according to claim 29, wherein in a case where the rotor position is not detected at the rotor position detecting step, the threshold value is changed and steps of the rotor position search pulse applying step are repeated.

31. The motor driving method according to claim 30, wherein the changed threshold value is stored.

32. The motor driving method according to claim 15, further comprising applying a predetermined number of kick pulses to shift the rotor position from the dead point, when it is determined that the rotor position is positioned at a dead point in a case where the rotor position is not detected at the rotor position detecting step, wherein the steps of applying the search pulse are repeated again after applying the kick pulses.

33. The motor driving method according to claim 32, wherein the predetermined number of kick pulses applied at the kick pulse applying step comprises two kinds of pulses which are out of phase by about 90 degrees with each other.

34. The motor driving method according to claim 32, wherein the predetermined number of kick pulses comprises two or three kinds of pulses which are out of phase by about 60 or 120 degrees with each other.

35. The motor driving method according to claim 15, wherein the start rotation pulse comprises a PWM pulse which is sequential for a predetermined period to control a current peak value at a predetermined value.

36. The motor driving method according to claim 15, wherein the rotor position search pulse comprises a PWM pulse which is sequential for a predetermined period to control a current peak value at a predetermined value.

37. The motor driving method according to claim 15, wherein the rotor position is determined at the rotor position detecting step based on either one of a response signal while a current is increasing or a response signal while a current is decreasing or both of them.

38. The motor driving method according to claim 15, wherein, in a case where the predetermined number of rotations of the rotor is detected in the start mode, the mode is switched from the start mode to the counter electromotive voltage feedback mode.

39. The motor driving method according to claim 15, wherein, in a case where it is detected that the rotation speed based on an interval of the rotation of 60 electrical degrees of the rotor reaches a predetermined value in the start mode, the mode is switched from the start mode to the counter electromotive voltage feedback mode.

40. The motor driving method according to claim 15, wherein the first energized profile in the counter electromotive voltage mode is controlled, according to the interval of the rotation of 60 electrical degrees of the rotor in the start mode.

41. The motor driving method according to claim 15, wherein a comparison result of the response signal when the rotor position search pulse current reaches a predetermined value is used in determining the rotor position at the rotor position detecting step.

42. The motor driving method according to claim 15, wherein, in a case where a response signal based on a neutral point potential with respect to the rotor position search pulse is greater than a predetermined positive threshold value or the response signal is smaller than a predetermined negative threshold value, the rotor position is determined at the rotor position detecting step.

43. The motor driving method according to claim 15, when it is confirmed that the rotor is rotated to the next period of 60 electrical degrees in the start mode, a counter electromotive voltage zero cross of a predetermined phase winding to be generated in a middle of the period of 60 electrical degrees is to be detected just after the mode is switched from the start mode to the counter electromotive voltage feedback mode.

44. The motor driving method according to claim 15, wherein the rotor position search pulse is applied up to four times only at the rotor position search pulse applying step in the first round.

45. The motor driving method according to claim 15, wherein the rotor position search pulse is applied up to six times only at the rotor position search pulse applying step in the first round.

46. The motor driving method according to claim 15, wherein two specified phases are detection phases which are used to detect the response signal in order at the rotor position search pulse applying step.

47. The motor driving method according to claim 15, wherein one specified phase and one unspecified phase other than the specified phase are used to detect the response signal in order at the rotor position search pulse applying step.

48. The motor driving method according to claim 46, wherein, at the rotor position search pulse applying step, when a first detection phase of the two detection phases to detect the response signal is selected, a first rotor position search pulse is applied between two phases other than the first detection phase in a first polarity, and then, when a second detection phase is selected, a second rotor position search pulse is applied between two phases other than the second detection phase in the first polarity, and then, when the second detection phase is selected, a third rotor position search pulse is applied between two phases other than the second detection phase in a second polarity opposite to the first polarity, and then, when the first detection phase is selected, a fourth rotor position search pulse is applied between two phases other than the first detection phase in the second polarity opposite to the first polarity, or the first detection phase is selected and a third rotor position search pulse is applied between two phases other than the first detection phase in a second polarity opposite to the first polarity and then the second detection phase is selected and a fourth rotor position search pulse is applied between two phases other than the second detection phase in the second polarity opposite to the first polarity.

49. The motor driving method according to claim 48, wherein regarding a phase which is common among the first couple of phases other than the first detection phase selected when the first rotor position search pulse is applied and the second couple of phases other than the second detection phase selected when the second rotor position search pulse is applied at the rotor position search pulse applying step, in a case where it is a current source when the first rotor position search pulse is applied, it is a current sink when the second rotor position search pulse is applied, and in a case where it is the current sink when the first rotor position search pulse is applied, it is the current source when the second rotor position search pulse is applied.

50. The motor driving method according to claim 15, wherein a peak value of the rotor position search pulse current is controlled by an inputted torque command at the rotor position search pulse applying step.

51. The motor driving method according to claim 15, wherein a peak value of the start rotation pulse current is controlled by an inputted torque command at the start rotation pulse applying step.

52. The motor driving method according to claim 15, wherein as a result of the rotor position searching step, the start rotation pulse applying step of applying the start rotation pulse also serves as the rotor position search pulse applying step in the next round.

53. The motor driving method according to claim 52, wherein the start rotation pulse comprises a sequential PWM drive pulse for a predetermined period to control the current peak value at a predetermined value.

* * * * *